United States Patent
Takano

(10) Patent No.: US 12,542,818 B2
(45) Date of Patent: Feb. 3, 2026

(54) APPLICATION FUNCTION NODE AND COMMUNICATION METHOD

(71) Applicant: Sony Group Corporation, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 386 days.

(21) Appl. No.: 17/802,160

(22) PCT Filed: Mar. 5, 2021

(86) PCT No.: PCT/JP2021/008771
§ 371 (c)(1),
(2) Date: Aug. 25, 2022

(87) PCT Pub. No.: WO2021/192930
PCT Pub. Date: Sep. 30, 2021

(65) Prior Publication Data
US 2023/0081413 A1  Mar. 16, 2023

(30) Foreign Application Priority Data

Mar. 26, 2020  (JP) ................................ 2020-056231

(51) Int. Cl.
*H04L 65/1069* (2022.01)
*H04W 28/02* (2009.01)
*H04W 76/10* (2018.01)

(52) U.S. Cl.
CPC ..... *H04L 65/1069* (2013.01); *H04W 28/0268* (2013.01); *H04W 76/10* (2018.02)

(58) Field of Classification Search
CPC .................................................. H04L 65/1069
See application file for complete search history.

(56) References Cited

U.S. PATENT DOCUMENTS

| | | | | |
|---|---|---|---|---|
| 2018/0192390 | A1* | 7/2018 | Li | H04W 72/53 |
| 2019/0380031 | A1 | 12/2019 | Suthar et al. | |
| 2022/0086697 | A1* | 3/2022 | Tamura | H04W 28/24 |
| 2024/0064559 | A1* | 2/2024 | Qiao | H04L 47/803 |

FOREIGN PATENT DOCUMENTS

| | | | |
|---|---|---|---|
| JP | 2015-119392 A | 6/2015 | |
| JP | 2019-526970 A | 9/2019 | |

(Continued)

OTHER PUBLICATIONS

International Search Report and Written Opinion mailed on Jun. 1, 2021, received for PCT Application PCT/JP2021/008771, filed on Mar. 5, 2021, 10 pages including English Translation.

(Continued)

*Primary Examiner* — Huy D Vu
*Assistant Examiner* — Latha Chakravarthy
(74) *Attorney, Agent, or Firm* — XSENSUS LLP

(57) ABSTRACT

An application function node (10) includes a control unit (13). The control unit (13) acquires session information regarding a PDU session from a UDM node (30), determines, from a plurality of the PDU sessions, a first PDU session for maintaining communication and a second PDU session for stopping communication based on the session information, and requests to stop communication in the determined second PDU session.

11 Claims, 19 Drawing Sheets

(56) References Cited

FOREIGN PATENT DOCUMENTS

JP          2019-537334 A      12/2019
JP           2020-28000 A       2/2020

OTHER PUBLICATIONS

Nec et al., "Release PDU sessions due to revocation from AAA server or re-auth failure", 3GPP TSG SA WG2 #137e, S2-2002360, Feb. 24-27, 2020, 17 pages.

"3rd Generation Partnership Project; Technical Specification Group Services and System Aspects; System Architecture for the 5G System; Stage 2 (Release 15)", 3GPP Standard; Technical Specification; 3GPP TS 23.501, 3rd Generation Partnership Project (3GPP), Nov. 13, 2017 (Nov. 13, 2017), vol. SA WG2, No. V1.5.0,Nov. 13, 2017 (Nov. 13, 2017), pp. 1-170, France XP051391712, [retrieved on Nov. 13, 2017].

* cited by examiner

| SUPI | PDU Session ID | Release allowed status |
|---|---|---|
| 1 | 1, | OK |
| 2 | 3 | NG |
| 3 | 5. | OK |

FIG.13

| SUPI | PDU Session ID | Network Slice ID (S-NSSAI) |
|---|---|---|
| 1 | 1, | 1 |
| 2 | 3 | 2 |
| 3 | 5. | 3 |

FIG.18

| SUPI | PDU Session ID | Network Slice ID (S-NSSAI) | UE side release confirmation |
|---|---|---|---|
| 1 | 1, | 1 | NG |
| 2 | 3 | 2 | OK |
| 3 | 5. | 3 | OK |

APPLICATION FUNCTION NODE AND COMMUNICATION METHOD

CROSS-REFERENCE TO RELATED APPLICATIONS

The present application is based on PCT filing PCT/JP2021/008771, filed Mar. 5, 2021, which claims priority to Japanese Patent Application No. 2020-056231, filed Mar. 26, 2020, the entire contents of each are incorporated herein by reference.

FIELD

The present disclosure relates to an application function node and a communication method.

BACKGROUND

Various radio access methods and radio networks in cellular mobile communications (hereinafter, "Long Term Evolution (LTE)", "LTE-Advanced (LTE-A)", "LTE-Advanced Pro (LTE-A Pro)", "Fifth Generation (5G)", "New Radio (NR)", "New Radio Access Technology (NRAT)", "Evolved Universal Terrestrial Radio Access (EUTRA)", or "Further EUTRA (FEUTRA)") are under examination in Third Generation Partnership Project (3GPP). In the following description, LTE includes LTE-A, LTE-A Pro, and EUTRA, and NR includes NRAT and FEUTRA. In LTE and NR, a base station device (base station) is also referred to as an evolved NodeB (eNodeB) in LTE and a gNodeB in NR, while a terminal device (mobile station, mobile station device, or terminal) is also referred to as user equipment (UE). LTE and NR are cellular communication systems that arrange a plurality of areas covered by the base station, as cellular areas. A single base station may manage a plurality of cells.

In addition, for example, in a radio communication system in which beamforming is performed by a plurality of base station devices, there is a known base station device that orients a null in a direction other than a beam when transmitting the beam (refer to Patent Literature 1, for example).

CITATION LIST

Patent Literature

Patent Literature 1: JP 2015-119392 A

SUMMARY

Technical Problem

In the above technique, the base station device orients a null in a direction other than the beam to suppress interference with the terminal device and protect communication with the terminal device, but there is no consideration as to which communication should be preferentially protected. Therefore, there has been a possibility of hindering high priority communication in order to suppress interference with low priority communication.

Therefore, the present disclosure provides a mechanism capable of more reliably protecting communication with high priority against interference.

Solution to Problem

According to the present disclosure, an application function node is provided. The application function node includes a control unit. The control unit acquires session information regarding a PDU session from a UDM node, determines, from a plurality of the PDU sessions, a first PDU session for maintaining communication and a second PDU session for stopping communication based on the session information, and requests to stop communication in the determined second PDU session.

BRIEF DESCRIPTION OF DRAWINGS

FIG. 13 is a diagram illustrating information regarding a Network Slice held by the UDM node according to the embodiment of the present disclosure.

FIG. 18 is a diagram illustrating an example of confirmation suitability information held by the UDM node according to the embodiment of the present disclosure.

DESCRIPTION OF EMBODIMENTS

Figure 1:
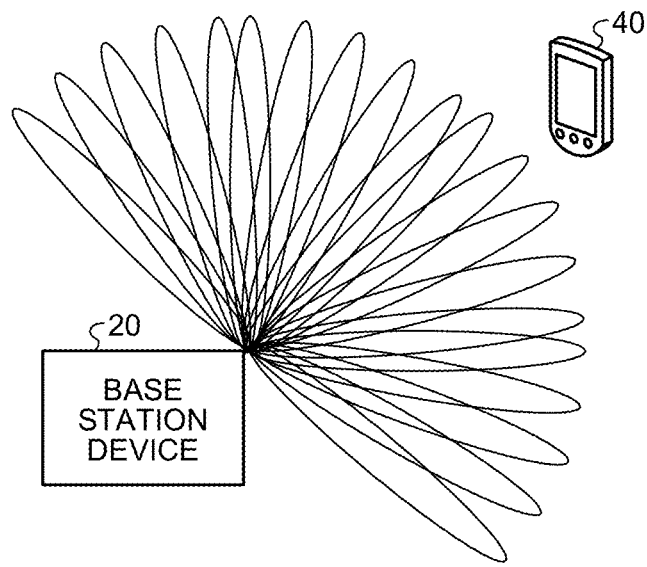
FIG. 1 is a diagram illustrating a beam used by a base station device.

A preferred embodiment of the present disclosure will be described in detail hereinbelow with reference to the accompanying drawings. Note that redundant descriptions will be omitted from the present specification and the drawings by assigning the same reference signs to components having substantially the same functional configuration.

Note that the description will be provided in the following order.
1. Introduction
    1.1. Local cellular network
    1.2. Comparison with Wi-Fi communication
    1.3. Beam sweeping process
    1.4. Inter-beam interference
2. Technical issues
3. Communication system
    3.1. Outline of interference control
    3.2. Configuration example of communication system
    3.3. Configuration example of AF node
    3.4. Configuration example of UDM Node
    3.5. Configuration example of base station device
    3.6. Configuration example of terminal device
4. Technical features
    4.1. PDU session specifying method
        4.1.1. Method of specifying based on forced termination suitability
        4.1.2. Method of specifying using network slice
        4.1.3. Method of specifying by using QoS
    4.2. Protecting critical PDU sessions
        4.2.1. Releasing non-critical PDU sessions
        4.2.2. Notification to terminal device
        4.2.3. Stopping traffic
    4.3. Release timing
5. Other embodiments
6. Supplementary notes 1. Introduction 1.1. Local Cellular Network In recent years, technology related to a local cellular network (for example, local 5G) has attracted attention. The local cellular network is a network that provides a cellular communication service in a limited area such as a factory, an office, a studio, a hospital, or a university, for example. By limiting the cellular service to a local area, there can be an advantage effect of being able to provide customized cellular services. Here, the local cellular network may broadly include modes such as networks referred to as a private network or a non-public network.

In use cases of a local cellular network, there may be, within a local area of the network, some critical communications that are desired to be protected with higher priority over other communications. For example, there may be, in a factory, a device that should definitely avoid communication failure in order to ensure a production line of the factory. In addition, communication used for surgery, in a hospital, needs to avoid occurrence of communication failures. In a case of performing online class distribution in a university, the distribution is considered to be the communication to be protected with higher priority over other communications. In this manner, the communication in the local area often include specific communication that is highly critical and should be protected with higher priority other communications.

1.2. Comparison with Wi-Fi Communication

In the past, communication based on local network standards such as 802.11 a, b, g, n, and ac, also referred to as Wi-Fi communication, has been used as communication in a local area. Although Wi-Fi communication can achieve good performance, the access point does not have a scheduler to coordinate resources between different users (terminal devices). Therefore, in the Wi-Fi communication, traffic between users is multiplexed by a contention-based method based on carrier sensing referred to as the Listen Before Talk mechanism. Wi-Fi communication is suffered from frequent occurrence of packet collisions. Therefore, in order to maintain communication quality even with a plurality of users, there is a request for using cellular communication instead of Wi-Fi communication even in a local area.

Figure 2:
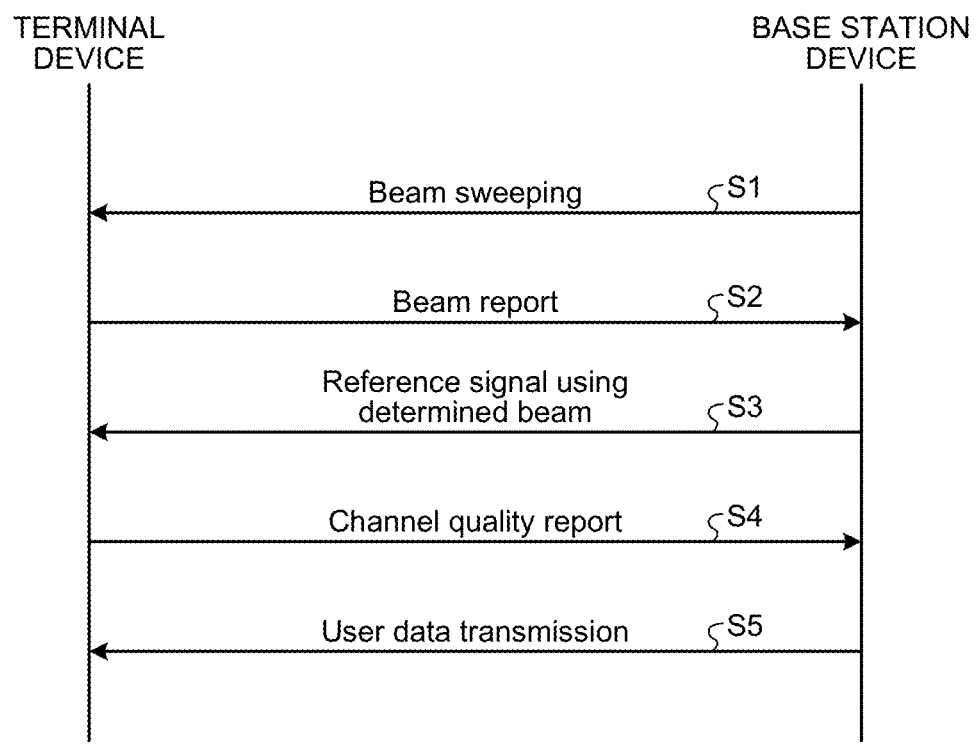
FIG. 2 is a sequence diagram illustrating a beam sweeping process.

1.3. Beam Sweeping Process 5G includes execution of beamforming by a base station device. First, beamforming by the base station device will be described with reference to FIGS. 1 and 2. FIG. 1 is a diagram illustrating a beam used by a base station device. FIG. 2 is a sequence diagram illustrating the beam sweeping process.

As illustrated in FIG. 1, a base station device 20 forms a plurality of beams. Therefore, when communicating with a terminal device 40 using beamforming, the base station device 20 first executes the beam sweeping process. The beam sweeping process is a process for determining a desirable beam between the base station device 20 and the terminal device 40.

The beam sweeping process performed between the base station device 20 and the terminal device 40 will be described with reference to FIG. 2. In FIG. 2, the terminal device corresponds to the terminal device 40, and the base station device corresponds to the base station device 20.

As illustrated in FIG. 2, the base station device 20 transmits a beam while performing sweeping (step S1). Next, the terminal device 40 measures the reception power of the transmission beam, and transmits, to the base station device 20, a beam report including information regarding a beam desired as a transmission beam based on the measurement result (step S2).

Based on the beam report, the base station device 20 transmits a reference signal to the terminal device 40 using the determined transmission beam (step S3). The terminal device 40 reports the channel quality measured based on the reference signal to the base station device 20 (step S4). Based on the reported channel quality, the base station device 20 transmits the user data to the terminal device 40 using the determined transmission beam (step S5).

1.4. Inter-Beam Interference

Figure 3:
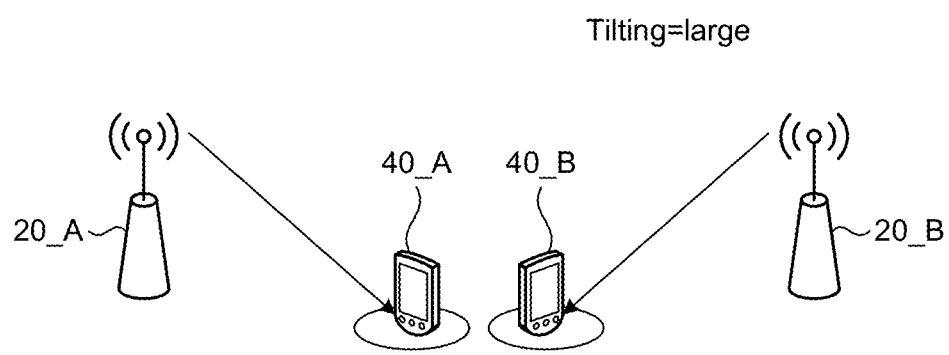
FIG. 3 is a diagram illustrating an example of beamforming by a base station device of a public network.
Figure 4:
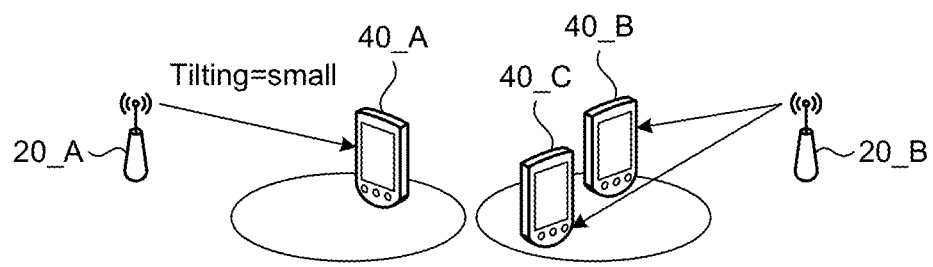
FIG. 4 is a diagram illustrating an example of beamforming by a base station device of a local cellular network.

As described above, when the base station device 20 performs beamforming, there is a problem of inter-beam interference due to beams transmitted by a plurality of base station devices 20. Such inter-beam interference will be described with reference to FIGS. 3 and 4. FIG. 3 is a diagram illustrating an example of beamforming by the base station device 20 of a public network. FIG. 4 is a diagram illustrating an example of beamforming by the base station device 20 of a local cellular network.

As illustrated in FIG. 3, for example, in a public network for outdoor use, antennas of the base station devices 20 are installed at high positions in order to avoid inter-beam interference, and the network is controlled so as to avoid occurrence of interference between the beams transmitted from adjacent base station devices 20_A and 20_B to the terminal devices 40_A and 40_B, respectively. Installing the antenna of the base station device 20 at a high position increases an angle (tilting) of the antenna of the base station device 20 with respect to the terminal device 40 at lower positions, resulting in small interference with an adjacent cell.

On the other hand, as illustrated in FIG. 4, for example, in a local cellular network for indoor use, the antenna of the base station device 20 may not be installed at a high position. This might result in a small angle (tilting) of the antenna of the base station device 20 with respect to the terminal device 40 at a lower position, causing the transmission beam also to reach the terminal device 40 of the adjacent cell, leading to an occurrence of interference.

More specifically, when the base station device 20 uses a beam for transmission, the reception intensity for the transmission beam at the terminal device 40 is not simply determined by the distance between the base station device 20 and the terminal device 40, but also changes depending on the beam direction. Therefore, the amount of interference given to the terminal device 40 of the adjacent cell changes depending on the direction of the beam transmitted by the base station device 20.

For example, the transmission beam from the base station device 20_A in FIG. 4 reaches not only the terminal device 40_A as a communication partner but also the terminal device 40_C of the adjacent cell, increasing the interference amount. In contrast, the terminal device 40_B, which is not located in the direction of the transmission beam of the base station device 20_A, is not likely to receive the transmission beam of the base station device 20_A, resulting in a small amount of interference given from the base station device 20_A to the terminal device 40_B. In this manner, even in the terminal devices 40_B and 40_C belonging to the same neighboring cell, the amount of interference varies depending on the direction of the transmission beam of the base station device 20_A.

The attenuation amount of the beam varies depending on the beam width. The narrower, the beam width, the less the energy is dispersed, which allows the beam to arrive at a distant position. For example, when the base station device 20_A in FIG. 4 uses a beam having a narrow beam width to transmit a signal to the terminal device 40_A, a transmission beam with high reception intensity reaches the terminal device 40_C in an adjacent cell, leading to a possibility of occurrence of significant interference to the terminal device 40_C. Note that the attenuation amount of the beam also varies depending on the frequency. Specifically, the higher the beam, the more the attenuation amount, cancelling the advantages of the gain of the beam. In this manner, whether interference occurs on the terminal device 40_C other than the communication partner is related to the direction and width of the beam transmitted by the base station device 20_A rather than the distance from the base station device 20_A, making it difficult to perform proper interference control.

As described above, there is a high possibility, in a local cellular network, of interference having a large influence on communication than before although there may be very critical communication to be protected. Therefore, it is necessary to protect critical communication of the base station device 20.

2. Technical Issues

Here, problems to protect a PDU session critical for a local cellular system will be considered.

In 4G and 5G, it is assumed that a quality of service (QoS) level is used as an index indicating a priority (importance) of communication. For example, by increasing a QoS level of critical communication, the cellular network system can perform critical communication with higher priority over other communication.

However, interference between beams is not considered in the QoS level. Therefore, there is a possibility that critical communication is hindered by inter-beam interference, for example, only by the QoS level, making it difficult for the cellular network system to protect the critical communication.

Furthermore, 5G has a newly introduced concept referred to as a network slice. By introducing the network slice, the cellular network system can provide a plurality of isolated networks. A cellular network system can provide a plurality of networks having different properties as virtual networks by using the network slice.

When a plurality of networks provided by the Network slice use different communication equipment and different communication paths, the networks would be completely separated from each other with no influence to each other. However, in the case of a plurality of networks using the same communication equipment, resources can be separated at the level of a virtual machine, for example, but it is difficult to completely separate each network.

It is possible to achieve isolation between the Network Slices on the core network side. On the other hand, in the RAN of the radio section, it is difficult to ensure Isolation between the Network Slices. Unless the frequency spectrum is completely separated, it is difficult to ensure Isolation in the RAN. Still, at present, since one frequency spectrum is shared by a plurality of network slices, the individual networks are not completely separated. In particular, in the local cellular network system, it is critical to perform communication using a limited frequency spectrum, and thus, it is considered that Isolation by the Network Slice cannot be ensured in the RAN.

In this manner, the conventional network system sometimes has difficulty in maintaining critical communication. For critical applications and services, the state in which communication in use is not protected and the communication has a critical failure because of interference is an emergency. As described above, it is difficult to suppress interference from other communication even with an attempt to protect the critical communication by using QoS. This is because QoS does not coordinate interference suppression between base station devices but is mainly used as prioritizing adjustment in scheduling of base station devices.

Meanwhile, as described above, there is a technology of virtually making communication independent by the Network Slice. In a state where communication is completely independent by the Network Slice, one communication would not affect (for example, interference) the other communication. However, in the RAN that is a radio section, it is difficult to achieve complete independency in communication. Therefore, even if critical communication is allocated to a specific network slice, there has been a possibility of occurrence of interference due to radio communication allocated to another network slice, which has made it difficult to avoid deterioration in quality of critical communication.

In particular, in a case where beamforming is used for communication in a factory, a studio, an office, or the like, for example, as in a local cellular network, the problem of interference would be more serious. Therefore, it has been required to establish a technique for protecting critical communication from interference by a beam, for example.

In view of this, the present disclosure proposes a mechanism for more reliably protecting critical communication from interference in a local cellular network.

3. Communication System

3.1. Outline of Interference Control

Figure 5:
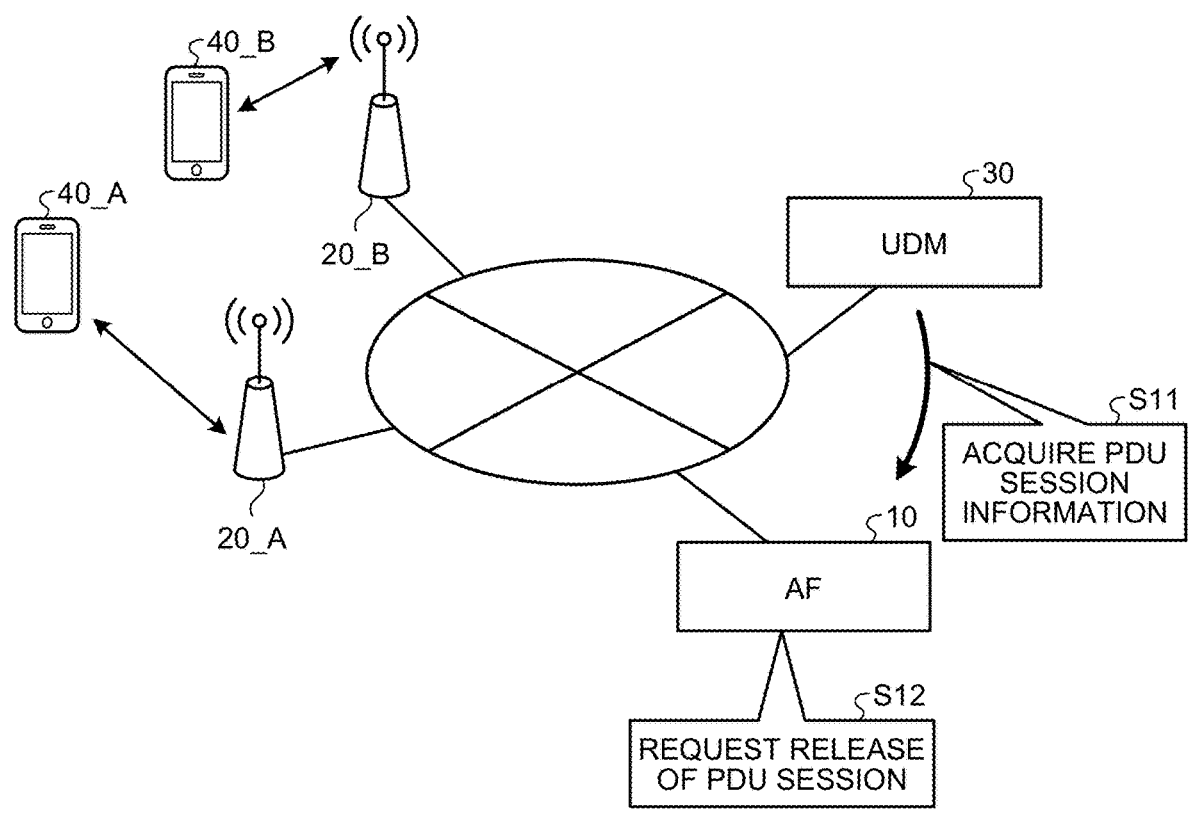
FIG. 5 is a diagram illustrating an outline of interference control according to an embodiment of the present disclosure.

Therefore, according to the embodiment of the present disclosure, interference control is performed so that critical communication is not hindered by interference. An outline of interference control according to the embodiment of the present disclosure will be described with reference to FIG. 5. FIG. 5 is a diagram illustrating an outline of interference control according to an embodiment of the present disclosure.

As illustrated in FIG. 5, the communication system according to the embodiment of the present disclosure includes a base station device 20, a terminal device 40, an application function (AF) node 10, and a UDM node 30. In the present embodiment, the AF node 10 of the local cellular network performs communication control. With the configuration in which the AF node 10 performs communication control in this manner, the local cellular network operator can protect more critical communication.

In the present embodiment, the base station device 20 and the terminal device 40 perform radio communication. Furthermore, the base station device 20, the AF node 10, and the UDM node 30 are connected to each other via a core network.

In the communication control of the present disclosure, first, the AF node 10 acquires PDU session information from the UDM node 30 (step S11). The PDU session information includes information indicating which PDU session is critical. The PDU session information is pre-registered in the UDM node 30 by an operator such as a local cellular network operator, for example.

Based on the obtained PDU session information, the AF node 10 determines a PDU session to be maintained in terms of communication and a PDU session to be released, and requests release of the PDU session determined to be released (step S12). The AF node 10 requests, for example, an SMF node (not illustrated) to release the PDU session.

For example, as illustrated in FIG. 5, in an assumed case, the base station device 20_A and the terminal device 40_A communicate in the second PDU session, while the base station device 20_B and the terminal device 40_B communicate in the first PDU session. In addition, in this assumed case, the UDM node 30 holds information indicating that communication with the terminal device 40_B is critical.

At this time, based on the PDU session information obtained from the UDM node 30, the AF node 10 determines to maintain the first PDU session with the terminal device 40_B, and requests to release the second PDU session with the terminal device 40_A.

By releasing the second PDU session between the base station device 20_A and the terminal device 40_A, it is possible to suppress interference of the second PDU session with the communication in the first PDU session between the base station device 20_B and the terminal device 40_B. With this configuration, the local cellular network can protect communication (first PDU session) between the base station device 20_B and the terminal device 40_B against the interference from the second PDU session.

Incidentally, there is a proposed technique of determining whether a secondary system can perform communication in vacant time period of a prioritized network referred to as a primary system. In such a system, there is a proposed technology related to communication control of determining whether communication in the secondary system affects communication in the primary system.

However, the technology related to the communication control described above is a technology of coordinating the communications in two systems of the primary system and the secondary system. The above technology is different, in this point, from the communication control of the present embodiment intended to coordinate communication in the same system. Furthermore, the communication system according to the present embodiment protects a specific critical PDU session, and the communication system according to the present embodiment performs communication control using an API of a core network as described below. The system of the present embodiment is different, also in this point, from the communication control in the primary system and the secondary system.

3.2. Configuration Example of Communication System

Figure 6:
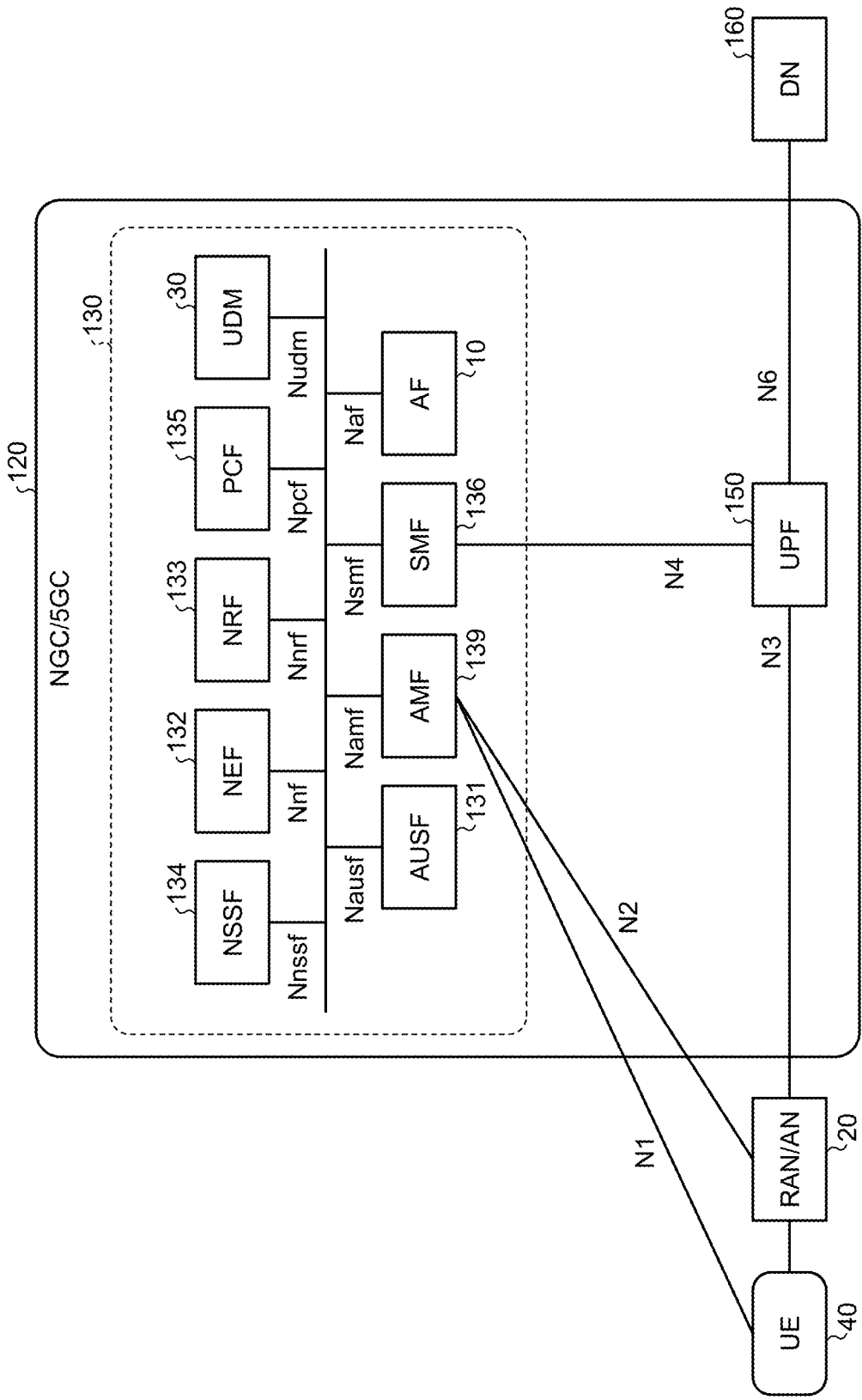
FIG. 6 is a diagram illustrating a configuration example of a communication system according to an embodiment of the present disclosure.

Next, a configuration example of a communication system according to the embodiment of the present disclosure will be described. FIG. 6 is a diagram illustrating a configuration example of the communication system according to the embodiment of the present disclosure. The communication system according to the present embodiment is the local cellular network system described above. Here, a case where the communication system is the fifth generation (5G) mobile communication system will be described in the present embodiment, but the type of communication system is not limited thereto. The communication system according to the present embodiment may be another mobile communication system such as LTE.

The cellular network system of the communication system according to the present embodiment includes a radio access network (RAN) and a core network (CN). The RAN is a radio system between the base station device 20 and the terminal device 40. The CN mainly performs permission and session management when the terminal device 40 connects to the cellular network. Also in 4G and 5G, the CN includes a control plan function and a user plane function.

As illustrated in FIG. 6, the communication system according to the present embodiment includes a 5G core network 120, a base station device (RAN/AN) 20, a terminal device (UE) 40, and a DN node 160.

The RAN/AN 20 has a function of connecting to a radio access network (RAN) and connecting to an access network (AN) other than the RAN. The RAN/AN 20 includes a base station device referred to as a gNB or an ng-eNB.

The 5G core network 120 is also referred to as 5G Core (5GC)/Next Generation Core (NGC). Hereinafter, the 5G core network 120 is also referred to as a 5GC/NGC 120. The 5GC/NGC 120 is connected to user equipment (UE) 40 via the RAN/AN 20.

The 5GC/NGC 120 includes a user plane function (UPF) node 150 and a control plane function group 130.

The UPF node 150 is a network function (NF) node which is critical in the user plane function. The UPF node 150 has a function of user plane processing. The UPF node 150 includes a routing/forwarding function of data handled in the user plane.

The UPF node 150 and the Data Network (DN) node 160 may be combined as a user plane function group. In this case, the DN node 160 is included in the 5GC/NGC 120. The DN node 160 has a function of connecting to a service provided by a cellular service provider, the Internet, or a third party service.

The control plane function group 130 includes an access management function (AMF) node 139, a session management function (SMF) node 136, an authentication server function (AUSF) node 131, a network slice selection function (NSSF) node 134, a network exposure function (NEF) node 132, a network repository function (NRF) node 133, a policy control function (PCF) node 135, a unified data management (UDM) node 30, and an AF node 10.

The AMF node 139 has functions such as registration processing, connection management, and mobility management regarding the UE 40. For example, the AMF node 139 may manage terminal handover of the terminal device 40. In addition, the AMF node 139 manages location information of the terminal device 40.

The SMF node 136 has functions such as session management and IP allocation and management of the UE 40. A main role of the SMF node 136 is to establish or release a PDU session for the terminal device 40 so as to manage the PDU session. In addition, the SMF node 136 assigns an IP address to the terminal device 40.

The UDM node 30 has functions of generating 3GPP AKA authentication information and user ID processing. The AF node 10 has a function of providing a service in interaction with the core network.

The UDM node 30, the AMF node 139, and the SMF node 136 are critical NF nodes of the Control Plan.

The AUSF node 131 has an authentication function. The NSSF node 134 has a function related to selection of a network slice. The NEF node 132 has a function of providing a capability and an event of a network function to a third party, the AF node 10, or an edge computing function.

The NRF node 133 has a function of discovering network functions and maintaining network function profiles. The PCF node 135 has a function of policy control.

Each Control Plan Function of the control plane function group 130 is a data server, and acquires information from the UDM node 30 that stores subscriber information of the terminal device 40, thereby acquiring information regarding the terminal device (UE) 40.

The UDM node 30, the AMF node 139, and the SMF node 136, which are NF nodes of the Control Plan, are configured to be able to mutually exchange information held in each node via the API. In addition, the UDM node 30, the AMF node 139, and the SMF node 136 are configured to be able to control operations of each other via the API.

Details of such an NF node are described in TS23.501 and TS23.502, for example.

In addition, the 5GC/NGC 120 is provided with an interface of transmitting information and controlling functions via an Application Programming Interface (API) referred to as a Service Based Interface. The API enables designation of a resource, and operations on the resource, such as GET (resource acquisition), POST (creation of resource and addition of data), PUT (create resource, update resource), and DELETE (resource deletion). The functions of the API are functions generally used in a Web service or the like, for example. Defining the interface with the API in this manner and disclosing the interface will facilitate addition of NF nodes, and enable the AF node 10 to change the operation of the Application by checking network information.

In addition, the 5GC/NGC 120 is provided with the NEF node 132. The NEF node 132 is used when the AF node 10 acquires information from each NF node. Specifically, the AF node 10 acquires information from each NF node via the NEF node 132. As defined in the standard, it is possible, in the local cellular network, to flexibly modify the core network. Therefore, it is considered that the AF node 10 can be modified to directly obtain information from the NF node or control the NF node without passing through the NEF node 132. In this manner, the AF node 10 that interacts with each NF node without passing through the NEF node 132 may be regarded as a new NF node different from the conventional AF node. Accordingly, the AF node 10 of the present disclosure may be defined as an NF node.

In addition, when the terminal device 40 communicates with the 5GC/NGC 120 via the base station device 20, a PDU session is prepared by the SMF node 136. Establishment of the PDU session by the SMF node 136 enables communication between the terminal device 40 and the base station device 20, making it possible for the terminal device 40 to perform Internet communication via the base station device 20.

The AF node 10 is configured to be able to communicate with (interact with) a core network (for example, 5GC). For example, the AF node 10 may support at least one of the following functions: Furthermore, the interaction between the AF node 10 and the associated NFs (for example, AMF and SMF) described below may be part of at least one of the following functions.

Application influence on traffic routing,

Accessing network exposure function (NEF), or

Interacting with the Policy framework for policy control.

Depending on the deployment of a business operator, the AF node 10 may be configured to be able to communicate directly with an associated NFs (at least a portion of the nodes included in the core network described above) or through the NEF.

The AF node 10 can acquire information disclosed by other NF(s) using an API (Service based interface) disclosed by the other NF(s). For example, the AF node 10 may grasp the status of the PDU session of the terminal device 40 (establishment, release, etc.) through the API of the SMF node 136. Such an API is basically created on the assumption that the AMF node 139 or another SMF node 136 refers to the information regarding the PDU session. In the present embodiment, the AF node 10 performs communication control by referring to and controlling information regarding a PDU session using such an API. Note that the AF node 10 also discloses a service-based interface "Naf" for other NF(s).

3.3. Configuration Example of AF Node

Figure 7:
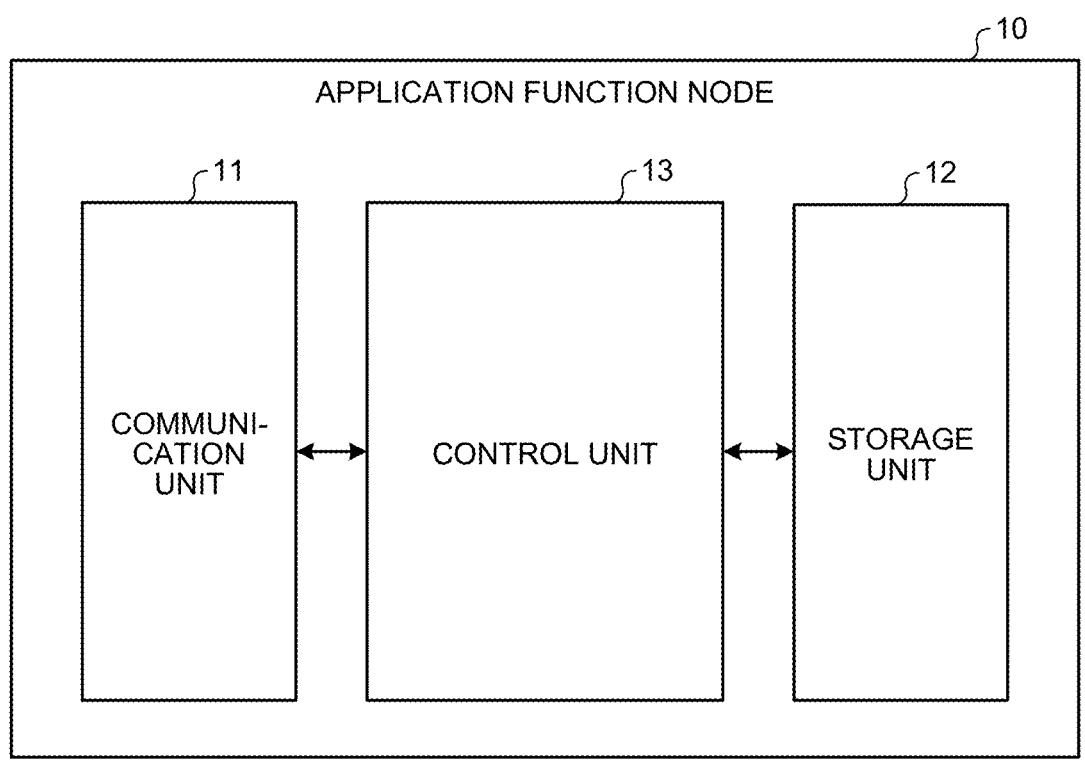
FIG. 7 is a block diagram illustrating a configuration example of an AF node according to the embodiment of the present disclosure.

Next, a configuration example of the AF node 10 will be described as an example of a configuration of each node of the 5GC/NGC 120 according to the embodiment of the present disclosure. FIG. 7 is a block diagram illustrating a configuration example of the AF node 10 according to the embodiment of the present disclosure.

The AF node 10 is an information processing device including a server device, for example, and includes a communication unit 11, a storage unit 12, and a control unit 13. Note that the configuration illustrated in FIG. 7 is a functional configuration, and the hardware configuration may be different from this. Furthermore, the functions of the AF node 10 may be implemented in a distributed manner in a plurality of physically separated configurations. For example, the AF node 10 may be constituted with a plurality of server devices. Furthermore, the functions of the AF node 10 may be implemented in a distributed manner in a plurality of physically and dynamically separated configurations.

The communication unit 11 is a communication interface for communicating with other devices. The communication unit 11 may be a network interface, or may be a device connection interface. The communication unit 11 has a function of directly or indirectly connecting to an Internet line. For example, the communication unit 11 may include a local area network (LAN) interface such as a network interface card (NIC), or may include a universal serial bus (USB) interface including a USB host controller, a USB port, and the like. Furthermore, the communication unit 11 may be a wired interface, or may be a wireless interface. The communication unit 11 functions as a communication means of the AF node 10. The communication unit 11 communicates with other nodes of the 5GC/NGC 120 under the control of the control unit 13.

The storage unit 12 is a data readable/writable storage device such as dynamic random access memory (DRAM), static random access memory (SRAM), a flash drive, or a hard disk. The storage unit 12 functions as a storage means of the AF node 10.

The control unit 13 is a controller that controls individual components of the AF node 10. The control unit 13 is implemented by a processor such as a central processing unit (CPU) or a micro processing unit (MPU), for example. For example, the control unit 13 is actualized by execution of various programs stored in the storage device inside the AF node 10 by the processor using random access memory (RAM) or the like as a work area. Note that the control unit 13 may be implemented by an integrated circuit such as an application specific integrated circuit (ASIC) or a field programmable gate array (FPGA). The CPU, MPU, ASIC, and FPGA can all be regarded as controllers.

The control unit 13 interacts with the core network to provide a service. Furthermore, the control unit 13 executes communication control processing to be described below.

3.4. Configuration Example of UDM Node

Figure 8:
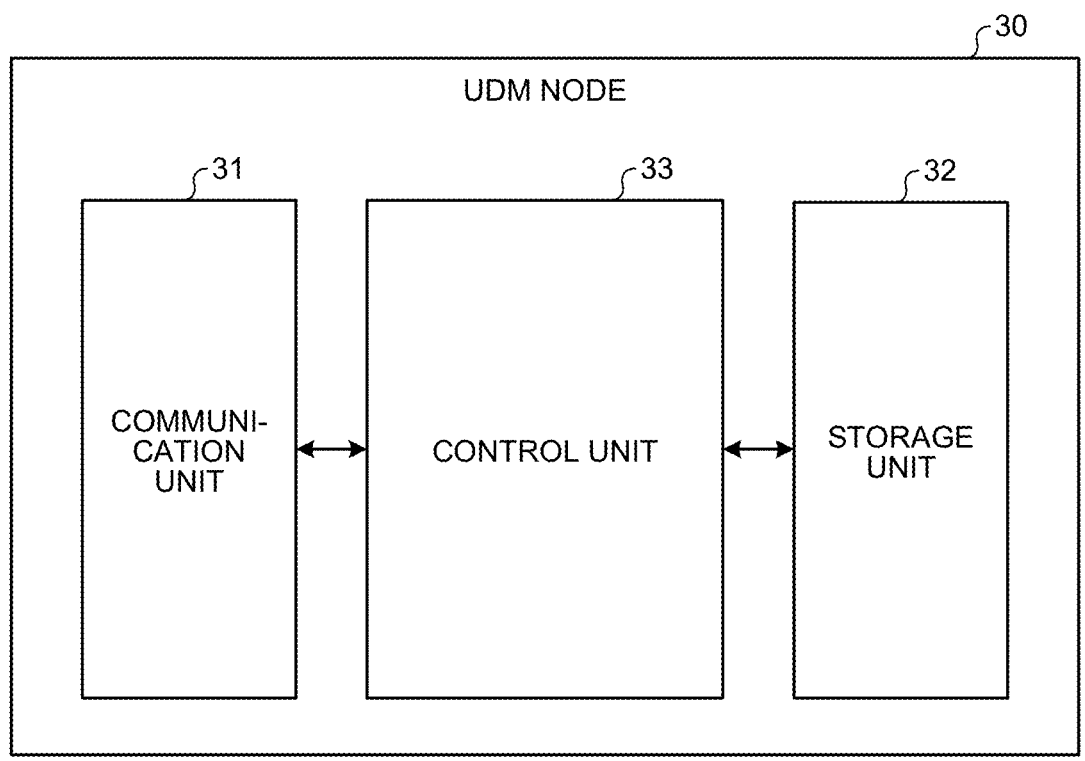
FIG. 8 is a block diagram illustrating a configuration example of a UDM node according to the embodiment of the present disclosure.

Next, a configuration example of the UDM node 30 will be described as an example of a configuration of each node of the 5GC/NGC 120 according to the embodiment of the present disclosure. FIG. 8 is a block diagram illustrating a configuration example of the UDM node 30 according to the embodiment of the present disclosure.

The UDM node 30 is an information processing device including a server device, for example, and includes a communication unit 31, a storage unit 32, and a control unit 33. Note that the configuration illustrated in FIG. 8 is a functional configuration, and the hardware configuration may be different from this. Furthermore, the functions of the UDM node 30 may be implemented in a distributed manner in a plurality of physically separated configurations. For example, the UDM node 30 may include a plurality of server devices. Furthermore, the functionality of UDM node 30 may be implemented in a dynamically distributed manner in a plurality of physically separated configurations.

The communication unit 31 is a communication interface for communicating with other devices. The communication unit 31 may be a network interface, or may be a device connection interface. The communication unit 31 has a function of directly or indirectly connecting to an Internet line. For example, the communication unit 31 may include a local area network (LAN) interface such as a network interface card (NIC), or may include a universal serial bus (USB) interface including a USB host controller, a USB port, and the like. Furthermore, the communication unit 31 may be a wired interface, or may be a wireless interface. The communication unit 31 functions as a communication means of the UDM node 30. The communication unit 31 communicates with other nodes of the 5GC/NGC 120 under the control of the control unit 33.

The storage unit 32 is a data readable/writable storage device such as dynamic random access memory (DRAM), static random access memory (SRAM), a flash drive, or a hard disk. The storage unit 32 functions as a storage means of the UDM node 30. The storage unit 32 stores, for example, PDU session information to be described below.

The control unit 33 is a controller that controls individual components of the UDM node 30. The control unit 33 is implemented by a processor such as a central processing unit (CPU) or a micro processing unit (MPU), for example. For example, the control unit 33 is implemented by execution of various programs stored in the storage device inside the UDM node 30 by the processor using random access memory (RAM) or the like as a work area. Note that the control unit 33 may be implemented by an integrated circuit such as an application specific integrated circuit (ASIC) or a field programmable gate array (FPGA). The CPU, MPU, ASIC, and FPGA can all be regarded as controllers.

The control unit 33 interacts with the core network to provide a service. Furthermore, the control unit 33 executes communication control processing to be described below.

Note that, as an example of the configuration of each node of the 5GC/NGC 120, the configuration example of the AF node 10 and the UDM node 30 has been described. However, other nodes can also be implemented by the configuration similar to the AF node 10 and the UDM node 30. In this case, the control units 13 and 33 execute processing according to the function of each node.

3.5. Configuration Example of Base Station Device

The base station device 20 is a radio communication device that operates a cell and performs radio communication with the UE 40. The base station device 20 is a type of communication device. The base station device 20 may be provided in plurality and be connected to each other. One or the plurality of base station devices 20 may be included in a radio access network (RAN). That is, the base station device 20 may be simply referred to as a RAN, a RAN node, an Access Network (AN), or an AN node. When a CN as a connection target is an EPC, a corresponding RAN is referred to as an Enhanced Universal Terrestrial RAN (EU-TRAN). When a CN as a connection target is a 5GC, a corresponding RAN is referred to as an NGRAN. The RAN in W-CDMA (UMTS) is referred to as UTRAN. The base station in LTE is referred to as Evolved Node B (eNodeB) or eNB. That is, EUTRAN includes one or a plurality of eNodeBs (eNBs). A NR base station is referred to as gNodeB or gNB. That is, NGRAN contains one or a plurality of gNBs. In addition, EUTRAN may include gNB (en-gNB) connected to the core network (EPC) in LTE communication systems (EPS). Similarly, NGRAN may include an ng-eNB connected to the core network 5GC in a 5G communication system (5GS). Additionally or alternatively, when the base station device 20 is an eNB, a gNB, or the like, the connection may be referred to as 3GPP Access. Additionally or alternatively, when the base station device 20 is a radio access point, the connection may be referred to as non-3GPP access. Additionally or alternatively, the base station device 20 may be an optical link device referred to as a Remote Radio Head (RRH) or a Remote Radio Unit (RRU). Additionally or alternatively, when the base station is gNB, the base station device 20 may be referred to as any of or a combination of gNB Central Unit (CU) and gNB Distributed Unit (DU). The gNB Central Unit (CU) hosts a plurality of upper layers (for example, RRC, SDAP, and PDCP) of the Access Stratum for communication with the UE 40. On the other hand, the gNB-DU hosts a plurality of lower layers (for example, RLC, MAC, and PHY) of the Access Stratum. That is, among the message information transmitted from the base station device 20, RRC signalling (semi-static notification) may be generated by the gNB CU, while DCI (dynamic notification) may be generated by the gNB-DU. Alternatively, among the RRC configuration (semi-static notification), for example, some configurations such as IE: cellGroupConfig may be generated by the gNB-DU, and the remaining configurations may be generated by the gNB-CU. These configurations may be transmitted and received through the F1 interface. The base station device 20 may be configured to be able to communicate with another base station device 20. For example, when a plurality of base station devices 20 is eNB each or a combination of eNBs and en-gNBs, the base station devices 20 may be connected by an X2 interface. Additionally or alternatively, when a plurality of base stations are gNBs or a combination of a gn-eNB and a gNB, the devices may be connected by an Xn interface. Additionally or alternatively, when the plurality of base station devices 20 is a combination of a gNB central unit (CU) and a gNB distributed unit (DU), the devices may be connected by the above-described F1 interface. The message/information transmitted from the base station device 20 may be transferred in communication between a plurality of base stations (for example, via X2, Xn, or F1 interface). In addition, the base station device 20 may be an Integrated Access and Backhaul (IAB) donor node or an IAB relay node that provides a radio access channel and a radio backhaul channel by using time division multiplexing, frequency division multiplexing, or space division multiplexing.

A cell provided by the base station device 20 is referred to as a serving cell. The serving cell includes a primary cell (PCell) and a secondary cell (SCell). In a case where the dual connectivity (for example, EUTRA-EUTRA Dual Connectivity, EUTRA-NR Dual Connectivity (ENDC), EUTRA-NR Dual Connectivity with 5GC, NR-EUTRA Dual Connectivity (NEDC), or NR-NR Dual Connectivity) is provided to the UE 40, the PCell and 0 or one or more SCell(s) provided by a Master Node (MN) are referred to as a Master Cell Group. Furthermore, the serving cell may include a Primary Secondary Cell or Primary SCG Cell (PSCell). That is, in a case where dual connectivity is provided to the UE 40, the PSCell and the SCell(s), which is zero, or one or more, provided by a secondary node (SN) are referred to as Secondary Cell Group (SCG). Unless specially configured (for example, PUCCH on SCell), a physical uplink control channel (PUCCH) is transmitted in the PCell and the PSCell, but is not transmitted in the SCell. In addition, a radio link failure is also detected in the PCell and the PSCell, but is not detected in the SCell (need not be detected). In this manner, since the PCell and the PSCell have a special role in the Serving Cell(s), these cells are also referred to as Special Cells (SpCells). One cell may be associated with one downlink component carrier and one uplink component carrier. In addition, the system bandwidth corresponding to one cell may be divided into a plurality of bandwidth parts. In this case, one or a plurality of bandwidth parts may be configured for the UE, and one bandwidth part may be used for the UE 40 as an Active BWP. In addition, radio resources (for example, a frequency band, a numerology (subcarrier spacing), and a slot format (slot configuration)) usable by the terminal device (UE) 40 may be different for each cell, each component carrier, or each BWP. The beam described above can be uniquely identified within one cell or one BWP.

The base station device 20 may be capable of communicating with each other via a base station device-core network interface (for example, S1 Interface, NG Interface, or the like). This interface may be implemented as wired or wireless interface.

The base station device 20 can be utilized, operated, and/or managed by various entities (subjects). Assumable examples of the entity include: a mobile network operator (MNO), a mobile virtual network operator (MVNO), a mobile virtual network enabler (MVNE), a neutral host network (NHN) operator, an enterprise, an educational institution (incorporated educational institutions, boards of education of local governments, and the like), a real estate (building, apartment, and the like) administrator, an individual, or the like.

Note that the subject of use, operation, and/or management of the base station device 20 is not limited thereto. The base station device 20 may be installed and/or operated by one business operator, or may be installed and/or operated by one individual. Needless to say, the installation/operation subject of the base station device 20 is not limited thereto. For example, the base station device 20 may be installed and operated by a plurality of business operators or a plurality of individuals in cooperation. Furthermore, the base station device 20 may be a shared facility used by a plurality of business operators or a plurality of individuals. In this case, installation and/or operation of the facility may be performed by a third party different from the user.

The concept of the base station device (also referred to as a base station) includes not only a donor base station but also a relay base station (also referred to as a relay station or a relay station device). Furthermore, a base station conceptually includes not only a structure having a function of a base station but also a device installed in the structure.

The structure is, for example, a building such as a high-rise building, a house, a steel tower, a station facility, an airport facility, a port facility, or a stadium. The concept of the structure includes not only buildings but also non-building structures such as tunnels, bridges, dams, fences, and steel columns, as well as facilities such as cranes, gates, and windmills. In addition, the concept of the structure includes not only land-based (ground-based, in a narrow sense) structures or underground structures but also structures on the water, such as a jetty and a mega-float, and underwater structures such as an ocean observation facility. The base station device can be rephrased as a processing device or an information processing device.

The base station device 20 may be a donor station or a relay station. The base station device 20 may be a fixed station or a mobile station. The mobile station is a radio communication device (for example, a base station device) configured to be movable. At this time, the base station device 20 may be a device installed on a mobile body, or may be the mobile body itself. For example, a relay station device having mobility can be regarded as the base station device 20 as a mobile station. In addition, a device designed to have mobility, such as a vehicle, a drone, or a smartphone, and having a function of a base station device (at least a part of the function of a base station device) also corresponds to the base station device 20 as a mobile station.

Here, the mobile body may be a mobile terminal such as a smartphone or a mobile phone. The mobile body may be a mobile body that moves on the land (ground in a narrow sense) (for example, a vehicle such as an automobile, a motorcycle, a bus, a truck, a motorbike, a train, or a linear motor car), or a mobile body (for example, subway) that moves under the ground (for example, through a tunnel).

The mobile body may be a mobile body that moves on the water (for example, a ship such as a passenger ship, a cargo ship, and a hovercraft), or a mobile body that moves underwater (for example, a submersible ship such as a submersible boat, a submarine, or an unmanned submarine).

Furthermore, the mobile body may be a mobile body that moves in the atmosphere (for example, an aircraft such as an airplane, an airship, or a drone), or may be a mobile body that moves outside the atmosphere (for example, an artificial astronomical object such as an artificial satellite, a spaceship, a space station, or a spacecraft). A mobile body moving outside the atmosphere can be rephrased as a space mobile body.

Furthermore, the base station device 20 may be a terrestrial base station device (ground station device) installed on the ground. For example, the base station device 20 may be a base station device arranged in a structure on the ground, or may be a base station device installed in a mobile body moving on the ground. More specifically, the base station device 20 may be an antenna installed in a structure such as a building and a signal processing device connected to the antenna. Note that the base station device 20 may be a structure or a mobile body itself. The "ground" represents not only a land (ground in a narrow sense) but also a ground or terrestrial in a broad sense including underground, above-water, and underwater. Note that the base station device 20 is not limited to the terrestrial base station device. The base station device 20 may be a non-terrestrial base station device (non-ground station device) capable of floating in the air or space. For example, the base station device 20 may be an aircraft station device or a satellite station device.

The aircraft station device is a radio communication device capable of floating in the atmosphere, such as an aircraft. The aircraft station device may be a device mounted on an aircraft or the like, or may be an aircraft itself. The concept of the aircraft includes not only heavy aircraft such as an airplane and a glider but also light aircraft such as a balloon and an airship. In addition, the concept of an aircraft includes not only a heavy aircraft and a light aircraft but also a rotorcraft such as a helicopter and an auto-gyro. Note that the aircraft station device (or an aircraft on which an aircraft station device is mounted) may be an unmanned aerial vehicle such as a drone.

Note that the concept of the unmanned aerial vehicle also includes an unmanned aircraft system (UAS) and a tethered UAS. The concept of unmanned aerial vehicles also includes a Lighter-than-Air (LTA) unmanned aircraft system (UAS) and a Heavier-than-Air (HTA) unmanned aircraft system (UAS). Other concepts of unmanned aerial vehicles also include High Altitude Platforms (HAPs) unmanned aircraft system (UAS).

The satellite station device is a radio communication device capable of floating outside the atmosphere. The satellite station device may be a device mounted on a space mobile body such as an artificial satellite, or may be a space mobile body itself. The satellite serving as the satellite station device may be any of a low earth orbiting (LEO) satellite, a medium earth orbiting (MEO) satellite, a geostationary earth orbiting (GEO) satellite, or a highly elliptical orbiting (HEO) satellite. Accordingly, the satellite station device may be a device mounted on a low earth orbiting satellite, a medium earth orbiting satellite, a geostationary earth orbiting satellite, or a highly elliptical orbiting satellite.

The coverage (for example, the cell) of the base station device 20 may be large such as a macro cell or small such as a pico cell. Needless to say, the coverage of the base station device 20 may be extremely small such as a femto cell. Furthermore, the base station device 20 may have a beamforming capability. In this case, the base station device 20 may form a cell or a service area for each beam.

In another aspect, the base station device 20 may include a set of a plurality of physical or logical devices as follows. For example, in the embodiment of the present disclosure, the base station device 20 may be classified into a plurality of devices of Baseband Unit (BBU) and Radio Unit (RU), and may be interpreted as an aggregate of these plurality of devices. Additionally or alternatively, in the embodiment of the present disclosure, the base station device 20 may be either or both of BBU and RU. The BBU and the RU may be connected by a predetermined interface (for example, eCPRI). Additionally or alternatively, RU may be referred to as Remote Radio Unit (RRU) or Radio DoT (RD). Additionally or alternatively, the RU may correspond to the gNB-DU described above. Additionally or alternatively, the BBU may correspond to the gNB-CU described above. Additionally or alternatively, the RU may be a device integrally formed with the antenna. An antenna (for example, an antenna integrally formed with an RU) included in the base station device 20 may adopt an Advanced Antenna System and support MIMO (for example, FD-MIMO) or beamforming. In the Advanced Antenna System, an antenna (for example, an antenna integrally formed with an RU) included in the base station device 20 may include 64 transmission antenna ports and 64 reception antenna ports, for example.

Figure 9:
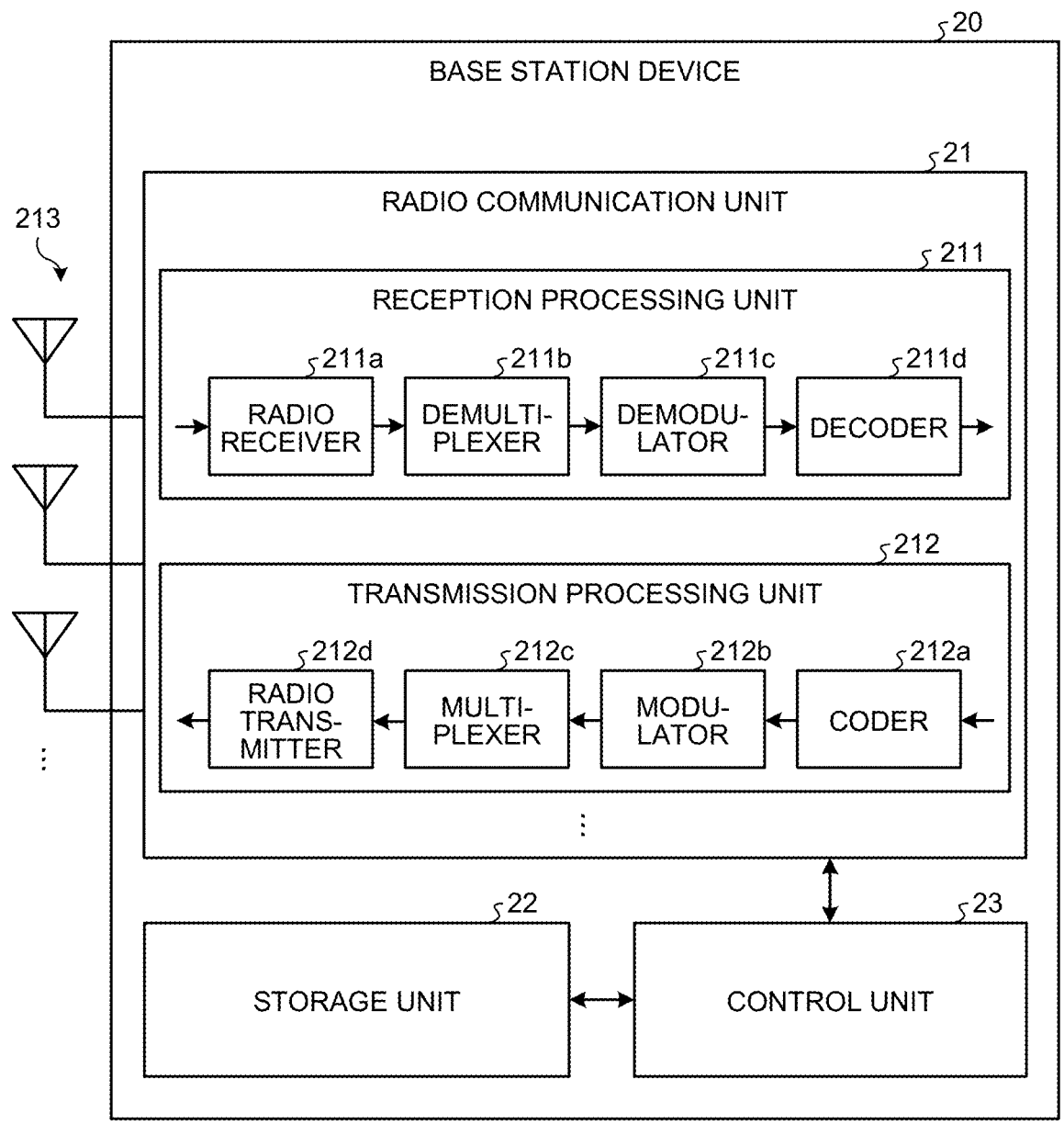
FIG. 9 is a diagram illustrating a configuration example of a base station device according to the embodiment of the present disclosure.
Figure 10:
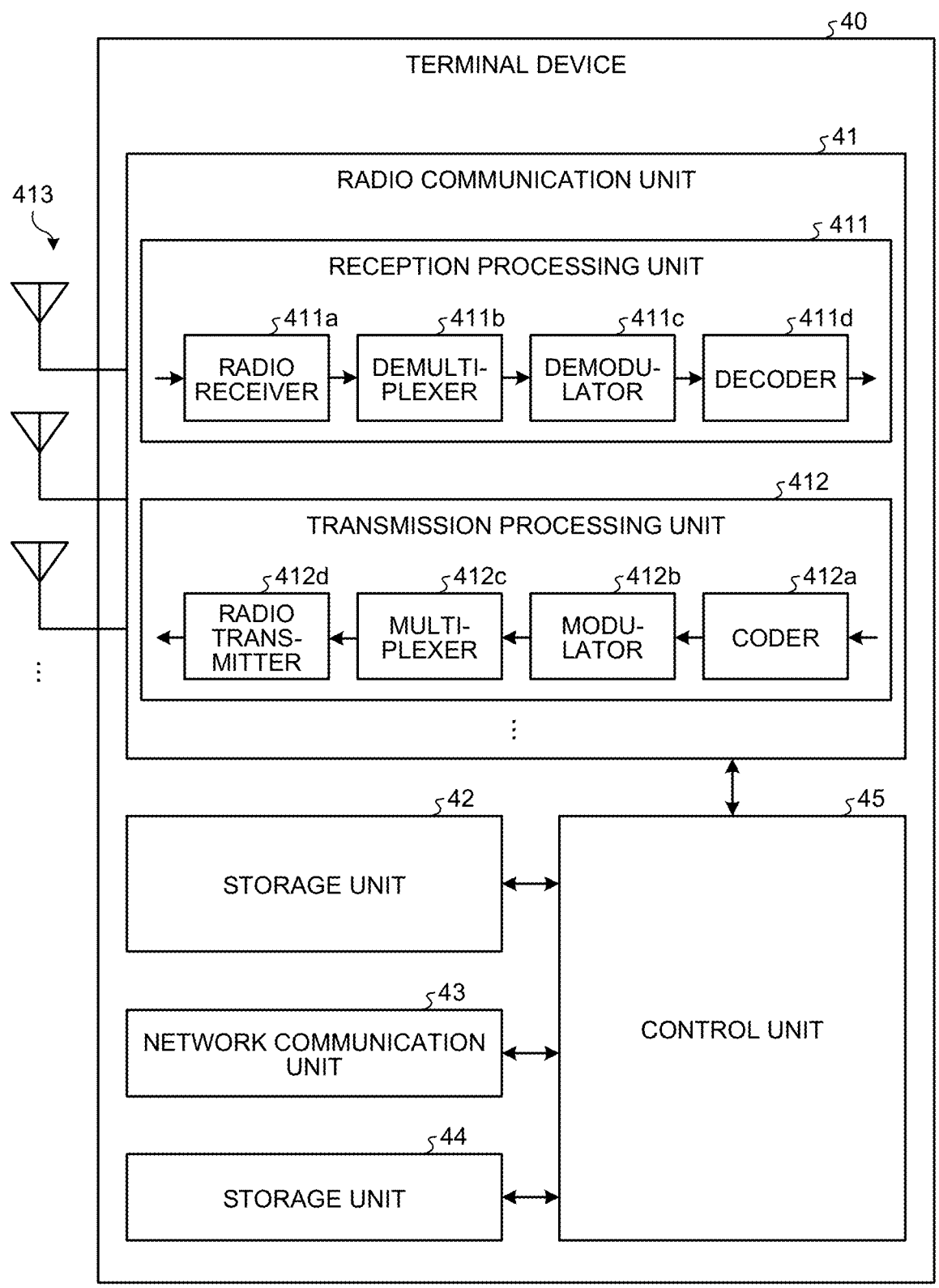
FIG. 10 is a diagram illustrating a configuration example of a terminal device according to an embodiment of the present disclosure.

Here, a configuration example of the base station device 20 will be described with reference to FIG. 9. FIG. 9 is a diagram illustrating a configuration example of the base station device 20 according to the embodiment of the present disclosure. The base station device 20 includes a signal processing unit 21, a storage unit 22, and a control unit 23. Note that the configuration illustrated in FIG. 9 is a functional configuration, and the hardware configuration may be different from this. Furthermore, the functions of the base station device 20 may be implemented in a distributed manner in a plurality of physically separated devices.

The signal processing unit 21 is a signal processing unit for performing radio communication with other radio communication devices (for example, the terminal device 40). The signal processing unit 21 operates under the control of the control unit 23. The signal processing unit 21 supports one or a plurality of radio access methods. For example, the signal processing unit 21 supports both NR and LTE. The signal processing unit 21 may support W-CDMA and cdma2000 in addition to NR and LTE.

The signal processing unit 21 includes a reception processing unit 211, a transmission processing unit 212, and an antenna 213. The signal processing unit 21 may include a plurality of the reception processing units 211, a plurality of the transmission processing units 212, and a plurality of the antennas 213. In a case where the signal processing unit 21 supports a plurality of radio access methods, individual portions of the signal processing unit 21 can be configured separately for each of the radio access methods. For example, the reception processing unit 211 and the transmission processing unit 212 may be individually configured for LTE and NR.

The reception processing unit 211 processes an uplink signal received via the antenna 213. The reception processing unit 211 includes a radio receiver 211a, a demultiplexer 211b, a demodulator 211c, and a decoder 211d.

For example, the radio receiver 211a performs processing on the uplink signal, such as down-conversion, removal of unnecessary frequency components, amplification level control, orthogonal demodulation, conversion to digital signal, removal of guard interval (cyclic prefix), and frequency domain signal extraction using fast Fourier transform. The demultiplexer 211b demultiplexes an uplink channel such as a physical uplink shared channel (PUSCH) or a physical uplink control channel (PUCCH) and an uplink reference signal from the signal output from the radio receiver 211a. Using a modulation scheme such as binary phase shift keying (BPSK) or quadrature phase shift keying (QPSK) for the modulation symbol of the uplink channel, the demodulator 211c demodulates the received signal. The modulation scheme used by the demodulator 211c may be 16 quadrature amplitude modulation (QAM), 64 QAM, or 256 QAM. In this case, the signal points on the constellation do not necessarily have to be equidistant. The constellation may be a non-uniform constellation (NUC). The decoder 211d performs decoding processing on the demodulated coded bits of the uplink channel. The decoded uplink data and uplink control information are output to the control unit 23.

The transmission processing unit 212 performs transmission processing of downlink control information and downlink data. The transmission processing unit 212 includes a coder 212a, a modulator 212b, a multiplexer 212c, and a radio transmitter 212d.

The coder 212a encodes the downlink control information and the downlink data input from the control unit 23 by using a coding method such as block coding, convolutional coding, or turbo coding. The modulator 212b modulates the coded bits output from the coder 212a by a predetermined modulation scheme such as BPSK, QPSK, 16 QAM, 64 QAM, or 256 QAM. In this case, the signal points on the constellation do not necessarily have to be equidistant. The constellation may be a non-uniform constellation. The multiplexer 212c multiplexes the modulation symbol of each of channels and the downlink reference signal and allocates the multiplexed signals on a predetermined resource element. The radio transmitter 212d performs various types of signal processing on the signal from the multiplexer 212c. For example, the radio transmitter 212d performs processing such as conversion to the time domain using fast Fourier transform, addition of a guard interval (cyclic prefix), generation of a baseband digital signal, conversion to an analog signal, quadrature modulation, upconvert, removal of extra frequency components, and power amplification. The signal generated by the transmission processing unit 212 is transmitted from the antenna 213.

The storage unit 22 is a data readable/writable storage device such as DRAM, SRAM, a flash drive, and a hard disk. The storage unit 22 functions as a storage means in the base station device 20.

The control unit 23 is a controller that controls individual components of the base station device 20. The control unit 23 is implemented by a processor such as a central processing unit (CPU) or a micro processing unit (MPU), for example. For example, the control unit 23 is implemented by execution of various programs stored in the storage device inside the base station device 20 by the processor using random access memory (RAM) or the like as a work area. Note that the control unit 23 may be implemented by an integrated circuit such as an application specific integrated circuit (ASIC) or a field programmable gate array (FPGA). The CPU, MPU, ASIC, and FPGA can all be regarded as controllers.

3.6. Configuration Example of Terminal Device

The terminal device 40 is a radio communication device that performs radio communication with the base station device 20. Examples of the terminal device 40 include a mobile phone, a smart device (smartphone or tablet), a personal digital assistant (PDA), or a personal computer. Furthermore, the terminal device 40 may be a device such as a business camera equipped with a communication function, or may be a motorcycle, a moving relay vehicle, or the like on which communication equipment such as a field pickup unit (FPU) is mounted. The terminal device 40 may be a machine to machine (M2M) device or an Internet of Things (IoT) device.

Furthermore, the terminal device 40 may be capable of sidelink communication with another terminal device 40. The terminal device 40 may be capable of using an automatic retransmission technology such as HARQ when performing sidelink communication. Furthermore, the terminal device 40 may be capable of LPWA communication with other communication devices (for example, the base station device 20 or another terminal device 40). In addition, the radio communication used by the terminal device 40 may be radio communication using millimeter waves. The radio communication (including sidelink communication) used by the terminal device 40 may be radio communication using radio waves or wireless communication (optical wireless communication) using infrared rays or visible light.

Furthermore, the terminal device 40 may be a mobile device. Here, the mobile device is a movable radio communication device. At this time, the terminal device 40 may be a radio communication device installed on a mobile body, or may be the mobile body itself. For example, the terminal device 40 may be a vehicle that moves on a road, such as an automobile, a bus, a truck, or a motorbike, or may be a radio communication device mounted on the vehicle. The mobile body may be a mobile terminal, or may be a mobile body that moves on land (on the ground in a narrow sense), in the ground, on water, or under water. Furthermore, the mobile body may be a mobile body that moves inside the atmosphere, such as a drone or a helicopter, or may be a mobile body that moves outside the atmosphere, such as an artificial satellite.

The terminal device 40 does not necessarily have to be a device directly used by a person. The terminal device 40 may be a sensor installed in a machine or the like in a factory, such as a sensor used for communication referred to as machine type communication (MTC). The terminal device 40 may be a machine to machine (M2M) device or an Internet of Things (IoT) device. Furthermore, the terminal device 40 may be a device having a relay communication function as represented by Device to Device (D2D) and Vehicle to everything (V2X). Furthermore, the terminal device 40 may be a device referred to as Client Premises Equipment (CPE) used in a radio backhaul or the like.

A configuration example of the terminal device 40 will described with reference to FIG. 9. FIG. 9 is a diagram illustrating a configuration example of the terminal device 40 according to the embodiment of the present disclosure. The terminal device 40 includes a signal processing unit 41, a storage unit 42, a network communication unit 43, an input/output unit 44, and a control unit 45. Note that the configuration illustrated in FIG. 9 is a functional configuration, and the hardware configuration may be different from this. Furthermore, the functions of the terminal device 40 may be implemented in a distributed manner in a plurality of physically separated configurations.

The signal processing unit 41 is a signal processing unit for radio communication with other radio communication devices (for example, the base station device 20 and the relay device 30). The signal processing unit 41 operates under the control of the control unit 45. The signal processing unit 41 supports one or a plurality of radio access methods. For example, the signal processing unit 41 supports both NR and LTE. The signal processing unit 41 may support W-CDMA and cdma2000 in addition to NR and LTE.

The signal processing unit 41 includes a reception processing unit 411, a transmission processing unit 412, and an antenna 413. The signal processing unit 41 may include a plurality of the reception processing units 411, a plurality of the transmission processing units 412, and a plurality of the antennas 413. In a case where the signal processing unit 41 supports a plurality of radio access methods, individual portions of the signal processing unit 41 can be configured separately for each of the radio access methods. For example, the reception processing unit 411 and the transmission processing unit 412 may be individually configured for LTE and NR.

The reception processing unit 411 processes a downlink signal received via the antenna 413. The reception processing unit 411 includes a radio receiver 411a, a demultiplexer 411b, a demodulator 411c, and a decoder 411d.

For example, the radio receiver 411a performs processing on the downlink signal, such as down-conversion, removal of unnecessary frequency components, amplification level control, orthogonal demodulation, conversion to digital signal, removal of guard interval (cyclic prefix), and frequency domain signal extraction using fast Fourier transform. The demultiplexer 411b demultiplexes a downlink channel, a downlink synchronization signal, and a downlink reference signal from the signal output from the radio receiver 411a. Examples of the downlink channel include a channel such as a physical broadcast channel (PBCH), a physical downlink shared channel (PDSCH), or a physical downlink control channel (PDCCH). The demodulator 211c demodulates the received signal using a modulation scheme such as BPSK, QPSK, 16QAM, 64QAM, or 256QAM onto the modulation symbol of the downlink channel. In this case, the signal points on the constellation do not necessarily have to be equidistant. The constellation may be a non-uniform constellation. The decoder 411d performs decoding processing on the demodulated coded bits of the downlink channel. The decoded downlink data and uplink control information are output to the control unit 45.

The transmission processing unit 412 performs transmission processing of uplink control information and uplink data. The transmission processing unit 412 includes a coder 412a, a modulator 412b, a multiplexer 412c, and a radio transmitter 412d.

The coder 412a encodes the uplink control information and the uplink data input from the control unit 45 by using a coding method such as block coding, convolutional coding, or turbo coding. The modulator 412b modulates the coded bits output from the coder 412a by a predetermined modulation scheme such as BPSK, QPSK, 16 QAM, 64 QAM, or 256 QAM. In this case, the signal points on the constellation do not necessarily have to be equidistant. The constellation may be a non-uniform constellation. The multiplexer 412c multiplexes the modulation symbol of each of channels and an uplink reference signal, and allocates the multiplexed signals on a predetermined resource element. The radio transmitter 412d performs various types of signal processing on the signal from the multiplexer 412c. For example, the radio transmitter 412d performs processing such as conversion to the time domain using inverse fast Fourier transform, addition of a guard interval (cyclic prefix), generation of a baseband digital signal, conversion to an analog signal, quadrature modulation, upconvert, removal of extra frequency components, and power amplification. The signal generated by the transmission processing unit 412 is transmitted from the antenna 413.

The storage unit 42 is a data readable/writable storage device such as DRAM, SRAM, a flash drive, and a hard disk. The storage unit 42 functions as a storage means in the terminal device 40.

The network communication unit 43 is a communication interface for communicating with other devices. For example, the network communication unit 43 is a LAN interface such as an NIC. Furthermore, the network communication unit 43 may be a wired interface, or may be a wireless interface. The network communication unit 43 functions as a network communication means of the terminal device 40. The network communication unit 43 communicates with other devices under the control of the control unit 45.

The input/output unit 44 is a user interface for exchanging information with the user. For example, the input/output unit 44 is an operation device such as a keyboard, a mouse, operation keys, and a touch panel, used by a user to perform various operations. Alternatively, the input/output unit 44 is a display device such as a liquid crystal display, or an organic electroluminescence (EL) display. The input/output unit 44 may be an acoustic device such as a speaker or a buzzer. Furthermore, the input/output unit 44 may be a lighting device such as a light emitting diode (LED) lamp. The input/output unit 44 functions as an input/output means (input means, output means, operation means, or notification means) provided on the terminal device 40.

The control unit 45 is a controller that controls individual parts of the terminal device 40. The control unit 45 is actualized by a processor such as a CPU or an MPU, for example. For example, the control unit 45 is implemented by a processor executing various programs stored in a storage device inside the terminal device 40 using RAM or the like as a work area. Note that the control unit 45 may be implemented by an integrated circuit such as an ASIC or an FPGA. The CPU, MPU, ASIC, and FPGA can all be regarded as controllers.

4. Technical Features

4.1. PDU Session Specifying Method

In a conventional communication system, there has been no method of protecting communication (for example, a PDU session) other than a method of protecting specific communication by QoS or a network slice. In view of this, the present disclosure proposes a method of specifying a critical PDU session by the technique described below.

4.1.1. Method of Specifying Based on Forced Termination Suitability

As described above, the UDM node 30 is an NF node that holds subscriber information. After having received, for example, a subscriber permanent identifier (SUPI) as an input from the AF node 10, the UDM node 30 returns, as a response, various types of information regarding the terminal device 40 corresponding to the SUPI to the AF node 10. Here, the SUPI is identification information (ID) that uniquely specifies SIM of the subscriber, that is, the terminal device 40. The AF node 10 can designate the specific terminal device 40 by designating the SUPI. Note that, although the following description is an example of a case where the subscriber information is SUPI, the subscriber information is not limited thereto. In the following description, it is allowable to use other subscriber information (for example, Subscriber Concealed Identifier (SUCI), Globally Unique Temporary Identifier (GUTI), or Temporary Mobile Subscriber Identity (TMSI)) in place of SUPI.

Here, the UDM node 30 according to the present embodiment holds, for each SUPI, forced termination information (an example of session information) indicating whether to permit forced termination of a PDU session, for example. That is, the UDM node 30 holds whether the PDU session is not critical as the forced termination information. The forced termination information may be registered by a local cellular network operator, for example. Alternatively, when the terminal device 40 first connects to the core network, registration may be performed via the base station device 20, or registration may be performed when connection to the core network is established. In addition, the terminal device 40 or the NF node may register suitability of performing forced termination of the PDU session every time the PDU session is established.

Figures 11, 12:
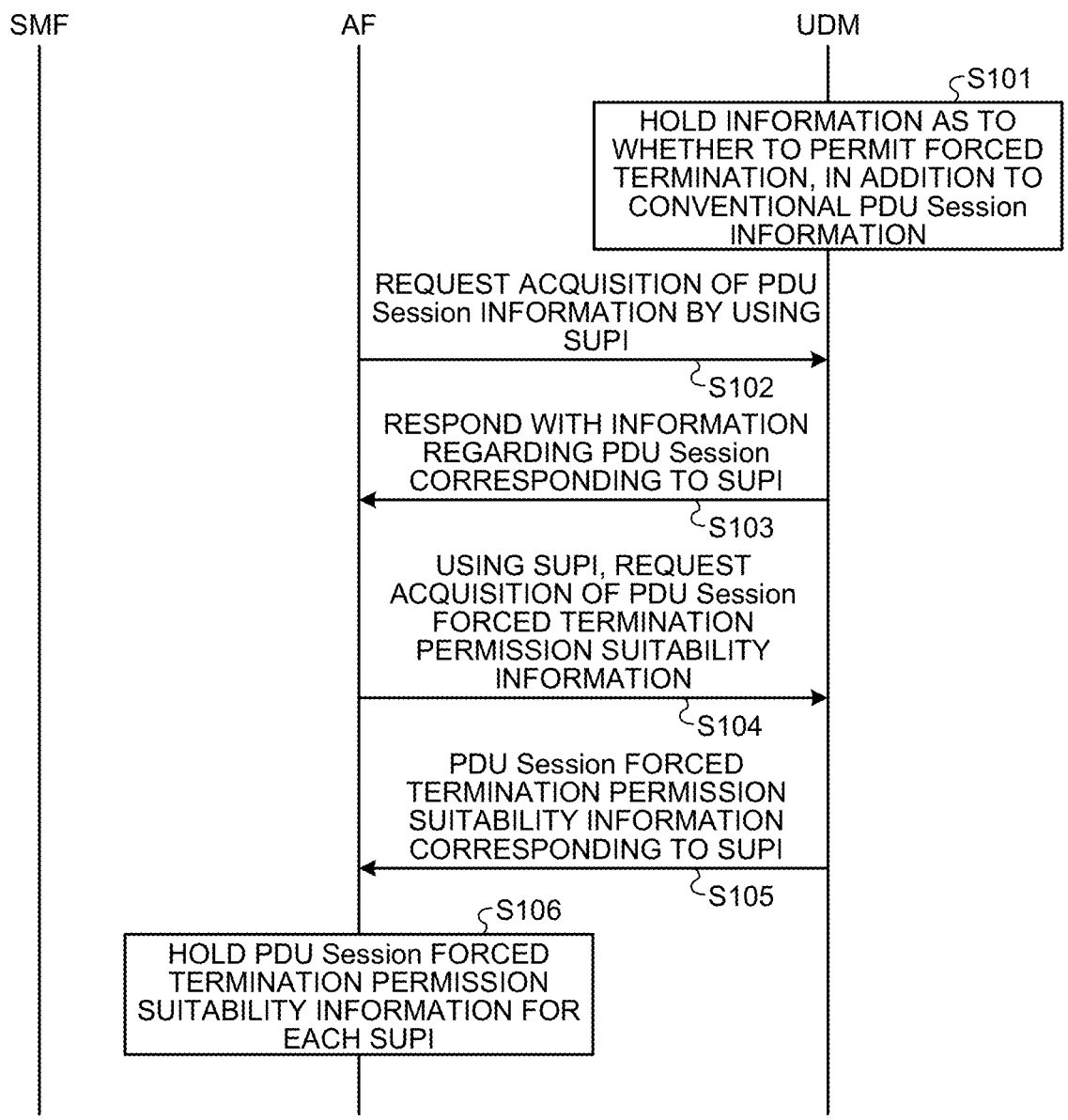
FIG. 11 is a diagram illustrating an example of forced termination information according to the embodiment of the present disclosure.
FIG. 12 is a sequence diagram illustrating an acquisition procedure of forced termination information by the AF node according to the embodiment of the present disclosure.

An example of forced termination information held by the UDM node 30 will be described with reference to FIG. 11. FIG. 11 is a diagram illustrating an example of forced termination information according to the embodiment of the present disclosure. The forced termination information is stored in the storage unit 32 of the UDM node 30 illustrated in FIG. 8, for example.

As illustrated in FIG. 11, the forced termination information includes a number for identifying SUPI, a PDU session ID identifying a PDU session, and information indicating the suitability of performing forced termination (communication stop).

For example, the PDU session ID of the terminal device 40 of SUPI=1 is "1", and the forced termination is "OK". Furthermore, the PDU session ID of the terminal device 40 of SUPI=2 is "3", and the forced termination is "NG". The PDU session ID of the terminal device 40 of SUPI=3 is "5", and the forced termination is "OK".

Therefore, by acquiring the forced termination information from the UDM node 30, the AF node 10 can specify that PDU session=1 with SUPI=1 and PDU session=3 with SUPI=3 are not critical PDU sessions. In addition, the AF node 10 can specify that PDU session=3 with SUPI=2 is a critical PDU session.

In this manner, the UDM node 30 holds the forced termination information, making it possible for the AF node 10 to specify critical PDU sessions and non-critical PDU sessions.

In addition, the AF node 10 requests the SMF node 136 to release the PDU sessions=1 and 5, which has been specified as not critical, making it possible to protect the PDU session=3, which has been specified as critical, against the interference by the PDU sessions=1 and 5.

In this manner, by requesting release of the PDU session specified as being non-critical by the AF node 10, it is possible to protect the PDU session specified as being critical.

Note that, here, the UDM node 30 holds the forced termination information, but the node is not limited thereto. For example, the AF node 10 may hold the forced termination information. Still, it is desirable to centrally manage the subscriber information, it is desirable that the UDM node 30 that manages the subscriber information also manages the forced termination information.

Hereinafter, a method by which the AF node 10 acquires the forced termination information will be described with reference to FIG. 12. FIG. 12 is a sequence diagram illustrating an acquisition procedure of forced termination information by the AF node 10 according to the embodiment of the present disclosure.

As illustrated in FIG. 12, in addition to conventional PDU session information, the UDM node 30 holds information (forced termination information) indicating whether or not the PDU session is allowed to be forcedly terminated (step S101). Such forced termination information is stored in the UDM node 30 in association with the SUPI as described above.

The AF node 10 requests acquisition of PDU session information by using the SUPI (step S102). Such a request is a conventional PDU session information acquisition request described above, for example. The UDM node 30 that has received the request responds with the information regarding the PDU session corresponding to the designated SUPI (step S103).

In addition, the AF node 10 requests acquisition of PDU session forced termination permission suitability information (forced termination information) by using the SUPI (step S104). The UDM node 30 that has received the request responds PDU session forced termination suitability information corresponding to the designated SUPI (step S105).

The AF node 10 that has acquired the information holds PDU session forced termination suitability information for each SUPI (step S106).

As described above, the UDM node 30 holds the suitability of forced termination of the PDU session for each SUPI, making it possible for the AF node 10 to specify the importance of the PDU session.

4.1.2. Method of Specifying Using Network Slice

Alternatively, the AF node 10 may specify the critical PDU session based on Network Slice information held by the UDM node 30.

The UDM node 30 holds information related to the Network Slice (an example of session information). FIG. 13 is a diagram illustrating information regarding a Network Slice held by the UDM node 30 according to the embodiment of the present disclosure.

As illustrated in FIG. 13, the UDM node 30 holds SUPI, a PDU session ID identifying a PDU session, and S-NSSAI which is a network slice ID identifying a network slice, in association with each other.

Here, it is assumed that the importance level of the PDU session is set for each Network Slice. For example, in an assumed case of FIG. 13, the smaller the value of S-NSSAI, the higher the importance of the PDU session.

At this time, by acquiring the information regarding the Network Slice illustrated in FIG. 13 from the UDM node 30, the AF node 10 can grasp the importance of the PDU session corresponding to the S-NSSAI, and can control the PDU session according to the importance.

When protecting the PDU session with S-NSSAI=1 against interference, the AF node 10 specifies, based on the information regarding the network slice in FIG. 13, that communication with SUPI=1 and PDU session ID=1, which are S-NSSAI=1, is critical communication. In addition, the AF node 10 specifies that communication with S-NSSAI other than 1, communication with SUPI=2 and PDU session ID=3 in FIG. 13, and communication with SUPI=3 and PDU session ID=5 are non-critical communication.

In order to protect the communication of SUPI=1 and PDU session ID=1, the AF node 10 requests the base station device 20 to perform forced termination of the communication of SUPI=2 and PDU session ID=3 and the communication of SUPI=3 and PDU session ID=5.

At this time, the AF node 10 may specify the PDU session requesting the forced termination based on not only the S-NSSAI but also the forced termination information. For example, it is assumed, in FIG. 13, that the AF node 10 determines communication of SUPI=2 and PDU session ID=3 with S-NSSAI=2 and 3 and communication of SUPI=3 and PDU session ID=5 as non-critical communication. In addition, it is assumed that the AF node 10 requests the SMF node 136 or the AMF node 139 to release the PDU session in order to protect SUPI=1 and PDU session ID=1, which are critical communications. In this case, the AF node 10 refers to the forced termination information and determines the PDU session for which the forced termination is to be requested. For example, it is assumed that the AF node 10 refers to the forced termination information illustrated in FIG. 11. In this case, the AF node 10 determines to perform forced termination of SUPI=3 and PDU session ID=5 for which forced termination "OK" is indicated, among communication of SUPI=2 and PDU session ID=3 and SUPI=3 and PDU session ID=5 determined to be non-critical communication. On the other hand, it is determined not to perform forced termination for SUPI=2 and PDU session ID=3 for which forced termination "NG" is indicated.

In this manner, the AF node 10 determines the PDU session to be forcibly terminated with reference to the S-NSSAI and the forced termination information, making it possible to suppress the forced termination of communication that should not be forcibly terminated while suppressing interference with critical communication.

Figure 14:
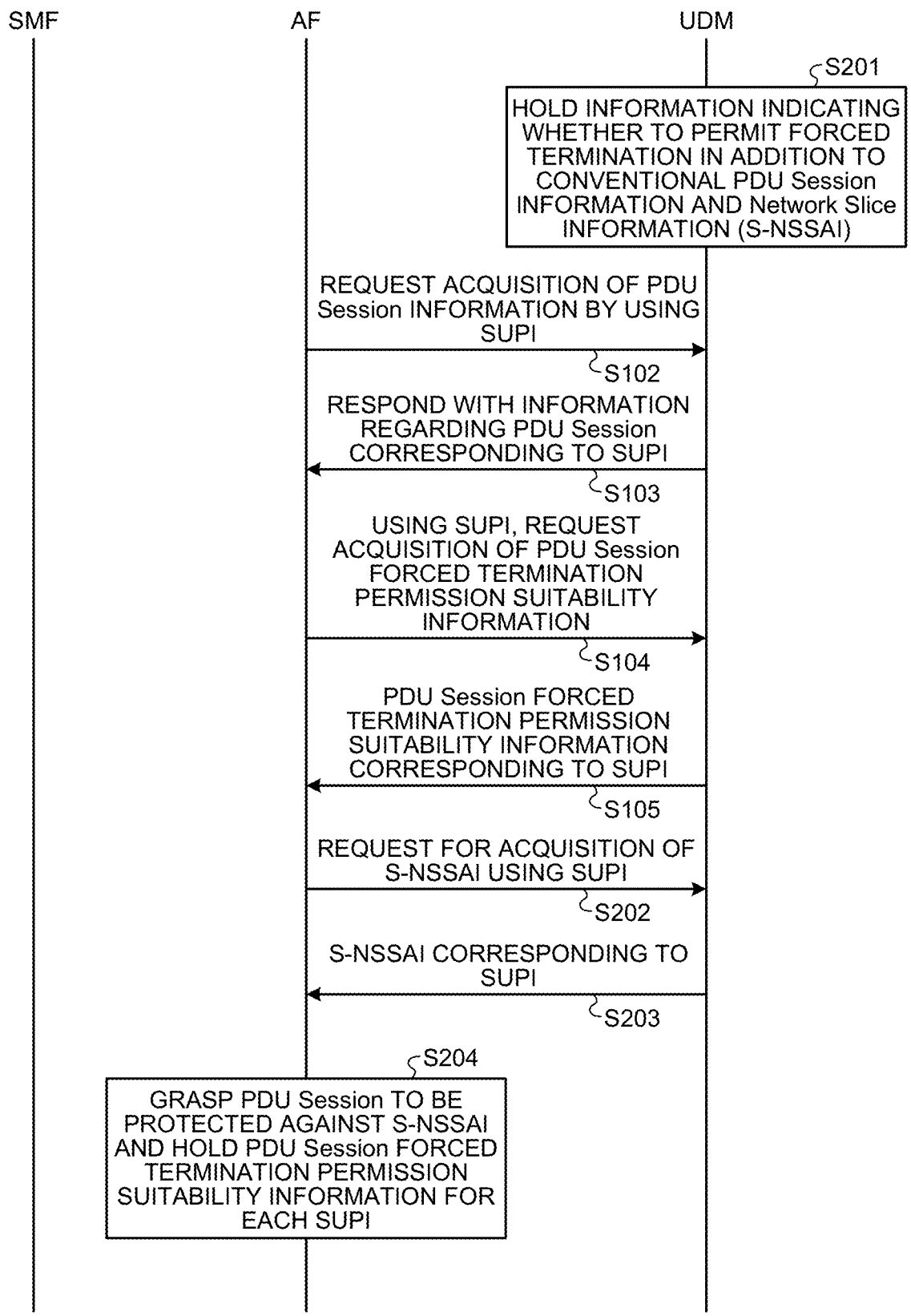
FIG. 14 is a sequence diagram illustrating a procedure of importance specifying processing by the AF node according to the embodiment of the present disclosure.

Hereinafter, the importance specifying processing of the PDU session by the AF node 10 will be described with reference to FIG. 14. FIG. 14 is a sequence diagram illustrating a procedure of importance specifying processing by the AF node 10 according to the embodiment of the present disclosure. Note that the procedure until the AF node 10 requests the forced termination information (PDU session forced termination permission suitability information) and acquires the information from the UDM node 30 is the same as the acquisition procedure illustrated in FIG. 12, and thus description thereof is omitted.

As illustrated in FIG. 14, in addition to the conventional PDU session information and network slice information, the UDM node 30 holds information (forced termination information) indicating whether the PDU session permits forced termination (step S201).

The AF node 10 that has acquired the PDU session forced termination permission suitability information requests acquisition of S-NSSAI by using the SUPI (step S202). The UDM node 30 that has received the request responds with information of S-NSSAI corresponding to the designated SUPI (step S203).

The AF node 10 that has acquired the information specifies the importance level of the PDU session based on the correspondence between the obtained S-NSSAI and the PDU session ID. In this manner, the AF node 10 grasps the PDU session to be protected from the S-NSSAI, and holds the PDU session forced termination suitability information for each SUPI (step S204).

As described above, by acquiring S-NSSAI, the AF node 10 can specify the importance of the PDU session.

4.1.3. Method of Specifying by Using QoS

Alternatively, the AF node 10 may specify the critical PDU session based on QoS information (for example, 5QI) held by the UDM node 30. The 5QI, which represents 5G QoS Identifier, is an identifier for identifying QoS in 5G.

The UDM node 30 holds QoS information. The AF node 10 acquires the QoS information from the UDM node 30, thereby specifying the importance of whether the corresponding SUPI and PDU sessions are critical.

In this manner, the AF node 10 determines the importance level of the PDU session with reference to the QoS information, thereby suppressing interference with the critical PDU session.

In addition, similarly to the S-NSSAI described above, the AF node 10 may determine the PDU session to be forcibly terminated with reference to the QoS information and the forced termination information. This makes it possible for the AF node 10 to suppress forced termination of communication that should not be forcibly terminated while suppressing interference with critical communication.

Figure 15:
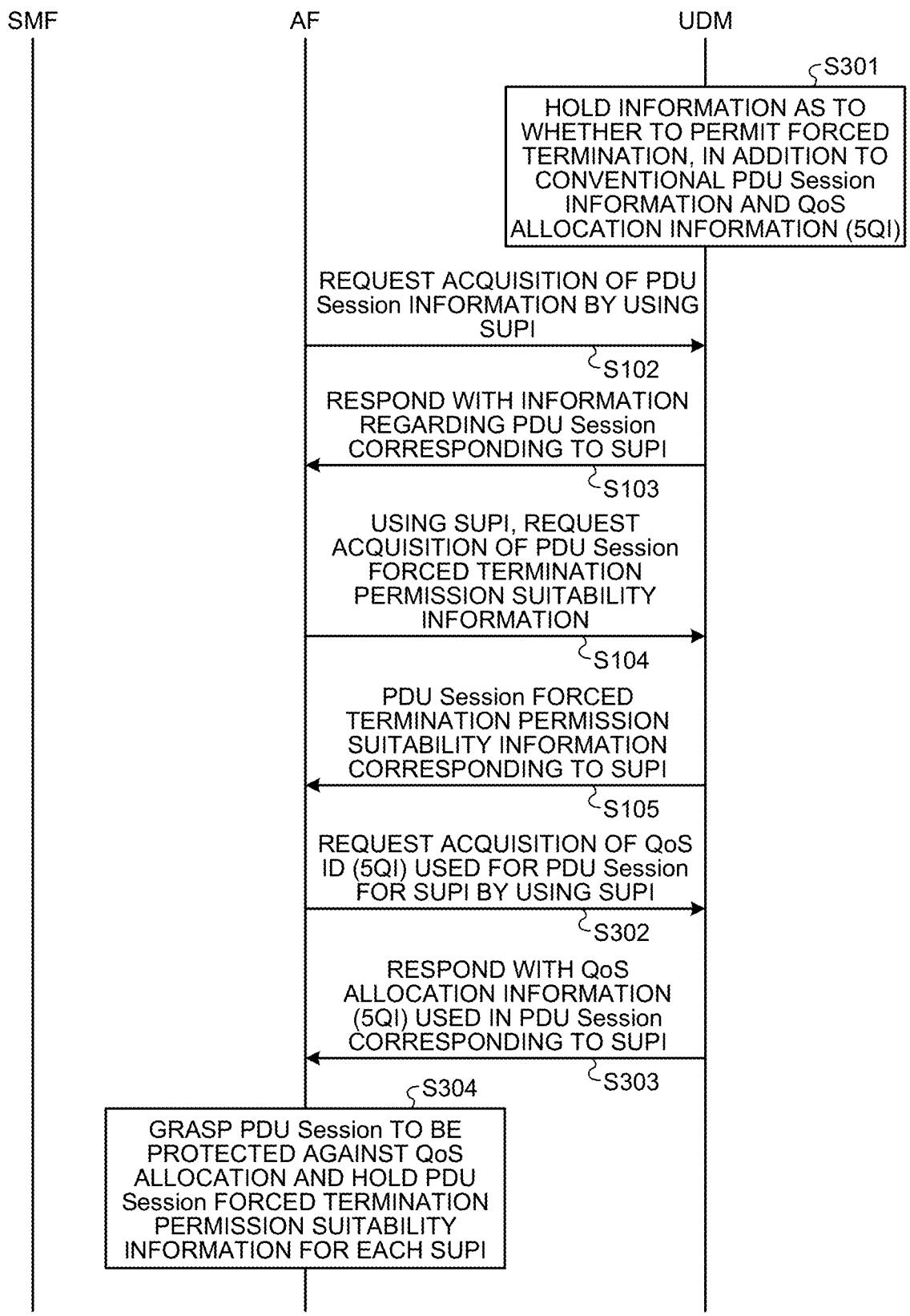
FIG. 15 is a sequence diagram illustrating a procedure of importance specifying processing by the AF node according to the embodiment of the present disclosure.

Hereinafter, the importance specifying processing of the PDU session by the AF node 10 will be described with reference to FIG. 15. FIG. 15 is a sequence diagram illustrating a procedure of importance specifying processing by the AF node 10 according to the embodiment of the present disclosure. Note that the procedure until the AF node 10 requests the forced termination information (PDU session forced termination permission suitability information) and acquires the information from the UDM node 30 is the same as the acquisition procedure illustrated in FIG. 12, and thus description thereof is omitted.

As illustrated in FIG. 15, in addition to the conventional PDU session information and QoS allocation information (5QI), the UDM node 30 holds information (forced termination information) indicating whether the PDU session permits forced termination (step S301).

The AF node 10 that has acquired the PDU session forced termination permission suitability information requests acquisition of the QoS ID (5QI) used for the PDU session for the SUPI by using the SUPI (step S302). The UDM node 30 that has received the request responds with QoS allocation information (5QI) used in the PDU session corresponding to the designated SUPI (step S303).

The AF node 10 that has acquired the information specifies the importance of the PDU session based on the correspondence between the acquired QoS allocation information and the PDU session ID. In this manner, the AF node 10 grasps the PDU session to be protected from the QoS allocation, and holds the PDU session forced termination suitability information for each SUPI (step S504).

As described above, by acquiring the QoS allocation information (5QI), the AF node 10 can specify the importance of the PDU session.

4.2. Protection of Critical PDU Sessions

The AF node 10 specifies critical and non-critical PDU sessions based on the information regarding the PDU sessions held by the UDM node 30 as described above. The following describes a method used by the AF node 10 to protect critical PDU sessions.

4.2.1. Releasing Non-Critical PDU Session

Figure 16:
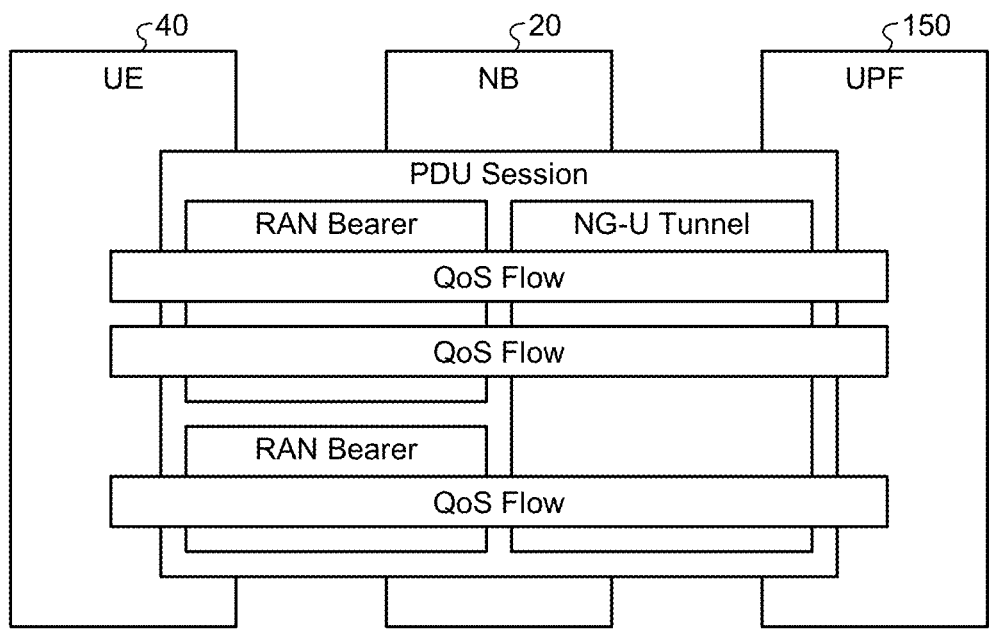
FIG. 16 is a diagram illustrating a PDU session.

Here, a PDU session will be described with reference to FIG. 16. FIG. 16 is a diagram illustrating a PDU session.

As illustrated in FIG. 16, the PDU session is established among the terminal device 40 (described as UE in FIG. 16), the base station device 20 (described as NB in FIG. 16), and the UPF node 150. After the PDU session is established, the terminal device 40 can communicate with the base station device 20 and the core network. One PDU session is allocated to one terminal device 40. One PDU session includes a plurality of QoS flows (QoS Flows). One QoS flow includes a plurality of IP packets (IP flows). The QoS of a plurality of IP packets included in one QoS flow is all the same.

When the QoS is the same, the flows will be handles as the same QoS flow in the PDU session even when one terminal device 40 communicates with a plurality of servers (an example of an NF node).

In the PDU session, a tunnel made of a GTP tunneling protocol referred to as NG-U Tunnel is provided (mapped) between the base station device 20 and the UPF node 150 for the terminal device 40. This tunnel is used for connection between the terminal device 40 and the UPF node 150. As illustrated in FIG. 16, one NG-U Tunnel is provided for one PDU session, and thus, a PDU session number (PDU Session ID) and an NG-U Tunnel ID are mapped on a one-to-one basis.

In addition, the PDU session includes a RAN bearer (for example, SRB or DRB) provided (mapped) between the terminal device 40 and the base station device 20. As illustrated in FIG. 16, one or a plurality of RAN Bearers are provided (mapped) in one PDU session.

The PDU session is managed by the SMF node 136. The SMF node 136 performs PDU session establishment (Create) and PDU session release (Release). Normally, the SMF node 136 releases the PDU session when communication between the base station device 20 and the terminal device 40 ends or when handover is performed. In the present embodiment, in response to a request from the AF node 10, the SMF node 136 releases non-critical PDU sessions in order to protect a critical PDU session regardless of termination of communication or handover.

More specifically, the AF node 10 requests release of the PDU session by using Nsmf_PDUSession_Release service operation of TS23.502. The AF node 10 first specifies non-critical PDU sessions and SUPIs corresponding to the PDU sessions that can be forcibly terminated. Thereafter, by inputting both the specified SUPI and PDU session to the SMF node 136, the AF node 10 requests release of the specified PDU session.

Alternatively, the AF node 10 may request the AMF node 139, rather than the SMF node 136, to release the PDU session.

For example, by using Namf_Communication_ReleaseUEContext service operation, the AF node 10 can release the information (for example, the PDU session) of the terminal device 40 from the AMF node 139. Although the AMF node 139 can release the PDU session similarly to the SMF node 136, it is necessary to input the UE Context when requesting release, and thus, it is more convenient to request release from the SMF node 136.

Figure 17:
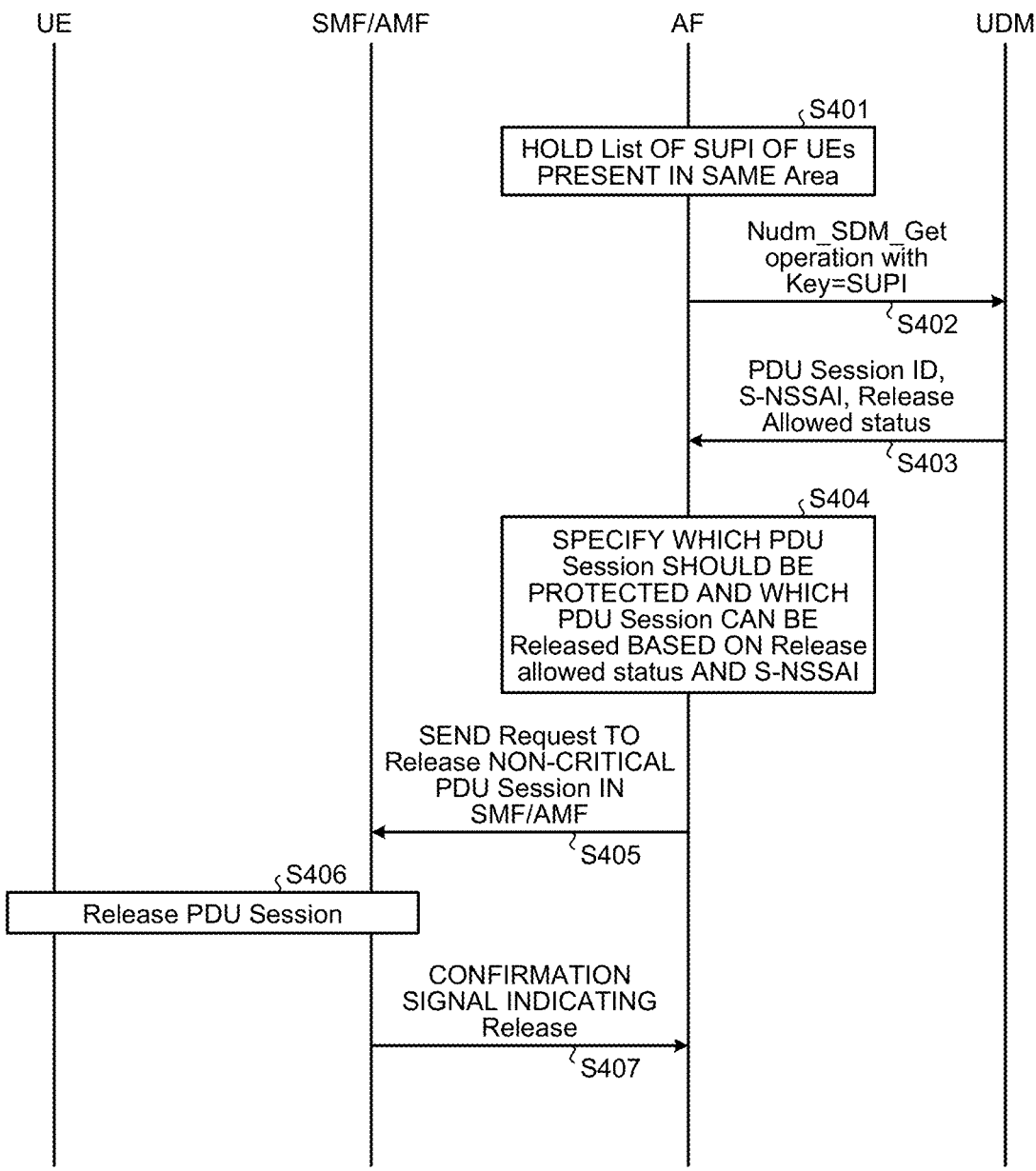
FIG. 17 is a sequence diagram illustrating a PDU session release processing procedure by the AF node according to the embodiment of the present disclosure.

Hereinafter, PDU session release processing by the AF node 10 will be described with reference to FIG. 17. FIG. 17 is a sequence diagram illustrating a PDU session release processing procedure by the AF node 10 according to the embodiment of the present disclosure.

As illustrated in FIG. 17, the AF node 10 holds a list of SUPI of UEs (terminal devices 40) existing in the same area (step S401). The area is an area in which at least a part of a local cellular network is disposed, for example, in a factory or an office.

Based on the held list, the AF node 10 requests the UDM node 30 to acquire the PDU session information by Nudm_SDM_Get operation using the SUPI of the UE existing in the same area as a Key (step S402).

The UDM node 30 responds to the request in association with the PDU session ID, the S-NSSAI, and the forced termination information (Release Allowed status) (step S403).

When having received the information, the AF node 10 specifies which PDU session should be protected and which PDU session can be released based on the forced termination information and the S-NSSAI (step S404). The AF node 10 sends a request to release, at the SMF node or the AMF node, the PDU session that is specified to be non-critical and releasable (step S405).

The SMF node 136 or the AMF node 139 releases the PDU session in response to the request (step S406), and transmits, to the AF node 10, a confirmation signal indicating that the requested PDU session has been released (step S406).

4.2.2. Notification to Terminal Device

As described above, if the SMF node 136 or the AMF node 139 suddenly releases the PDU session by using the Release function of the PDU session, this release might have an influence on the operation of the application of the terminal device 40. Therefore, the AF node 10 previously notifies the terminal device 40 of the future release of the PDU session so as to reduce the influence on the operation of the application of the terminal device 40.

More specifically, the AF node 10 notifies the terminal device 40 of the future release of the PDU session, and requests the SMF node 136 or the AMF node 139 to release the PDU session after confirmation of the release is obtained from the terminal device 40.

At this time, for example, the UDM node 30 may hold confirmation suitability information indicating whether the terminal device 40 should confirm the release of the PDU session.

FIG. 18 is a diagram illustrating an example of confirmation suitability information held by the UDM node 30 according to the embodiment of the present disclosure. The confirmation suitability information illustrated in FIG. 18 is stored in the storage unit 32 of the UDM node 30 illustrated in FIG. 8, for example.

As illustrated in FIG. 18, the UDM node 30 holds SUPI, a PDU session ID, a Network Slice ID (S-NSSAI), and confirmation suitability information in association with each other. For example, in the terminal device 40 of SUPI=1, the confirmation suitability information (UE side release confirmation) indicates "NG", and in the terminal device 40 of SUPI=2, the confirmation suitability information (UE side release confirmation) indicates "OK".

For example, when requesting release of the PDU session with the PDU session ID=3, the AF node 10 notifies the terminal device 40 with SUPI=2 of release confirmation before requesting the release from the SMF node 136 or the AMF node 139. When having received the release confirmation response from the terminal device 40 with SUPI=2, the AF node 10 requests the SMF node 136 or the AMF node 139 to release the PDU session with the PDU session ID=3.

Note that the AF node 10 may determine not to release the PDU session (in the example of FIG. 18, the PDU session with the PDU session ID=1 of the terminal device 40 with the SUPI=1) of the terminal device 40 having the confirmation suitability information of "NG" even in a case, for example, where it is specified that the PDU session is not critical.

In this manner, by making a determination to release the PDU session of the terminal device 40 having the confirmation suitability information of "OK", it is possible to suppress the influence on the terminal device 40.

Figure 19:
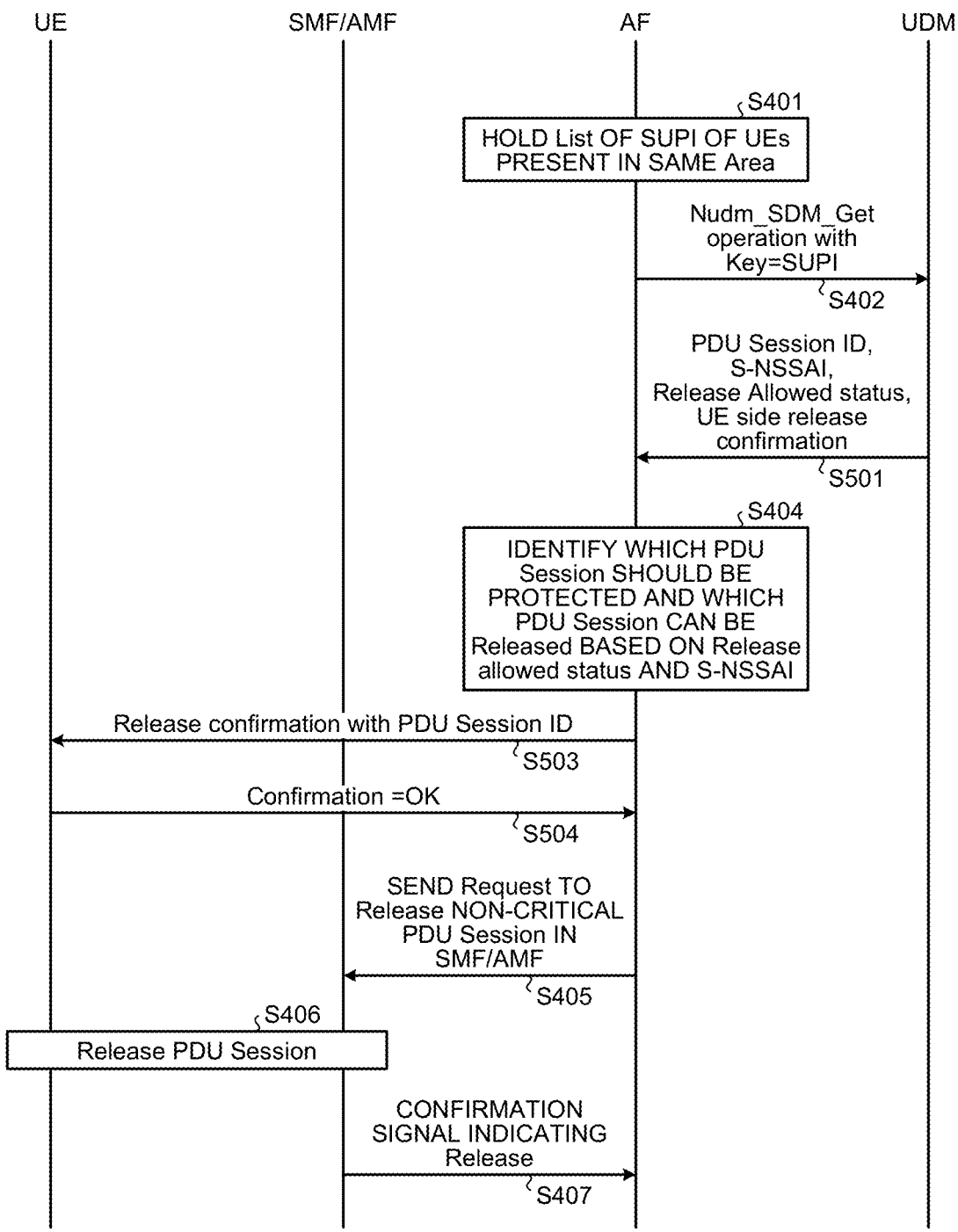
FIG. 19 is a sequence diagram illustrating a PDU session release processing procedure by the AF node according to the embodiment of the present disclosure.

Hereinafter, PDU session release processing by the AF node 10 will be described with reference to FIG. 19. FIG. 19 is a sequence diagram illustrating a PDU session release processing procedure by the AF node 10 according to the embodiment of the present disclosure. Note that the same procedures as those illustrated in FIG. 17 are denoted by the same reference numerals, and description thereof is omitted.

As a response to the Nudm_SDM_Get operation, the UDM node 30 transmits the PDU session ID, the S-NSSAI, the forced termination information (Release Allowed status), and the confirmation suitability information (UE side release confirmation) to the AF node 10 in association with each other (step S501). Subsequently, the AF node 10 that has specified the non-critical PDU session in step S404 transmits a release confirmation of the specified PDU session to the UE (terminal device 40) of the SUPI corresponding to the specified PDU session (step S503).

The UE that has received the release confirmation returns release confirmation (release OK) at a timing at which the PDU session may be released (step S504). The subsequent procedure is the same as the procedure illustrated in FIG. 17.

Here, the AF node 10 requests the SMF node 136 or the AMF node 139 to release the PDU session, thereby releasing the PDU session, but the release of the session is not limited thereto. For example, the UE may release the PDU session.

In this case, having received a release confirmation of the PDU session from the AF node 10, the UE releases the PDU session at the timing at which the PDU session may be released. In this manner, it is also possible for the UE to release the PDU session.

4.2.3. Stopping Traffic

In the example described above, the AF node 10 requests to release the PDU session in order to protect the critical PDU session, but the operation is not limited thereto. For example, the AF node 10 makes a request to forcibly stop the traffic of the PDU session specified as non-critical. This allows the AF node 10 to suppress interference due to traffic of non-critical PDU sessions and to protect critical PDU sessions. This is preferable when a communication time in the critical PDU session is relatively short, for example.

Figure 20:
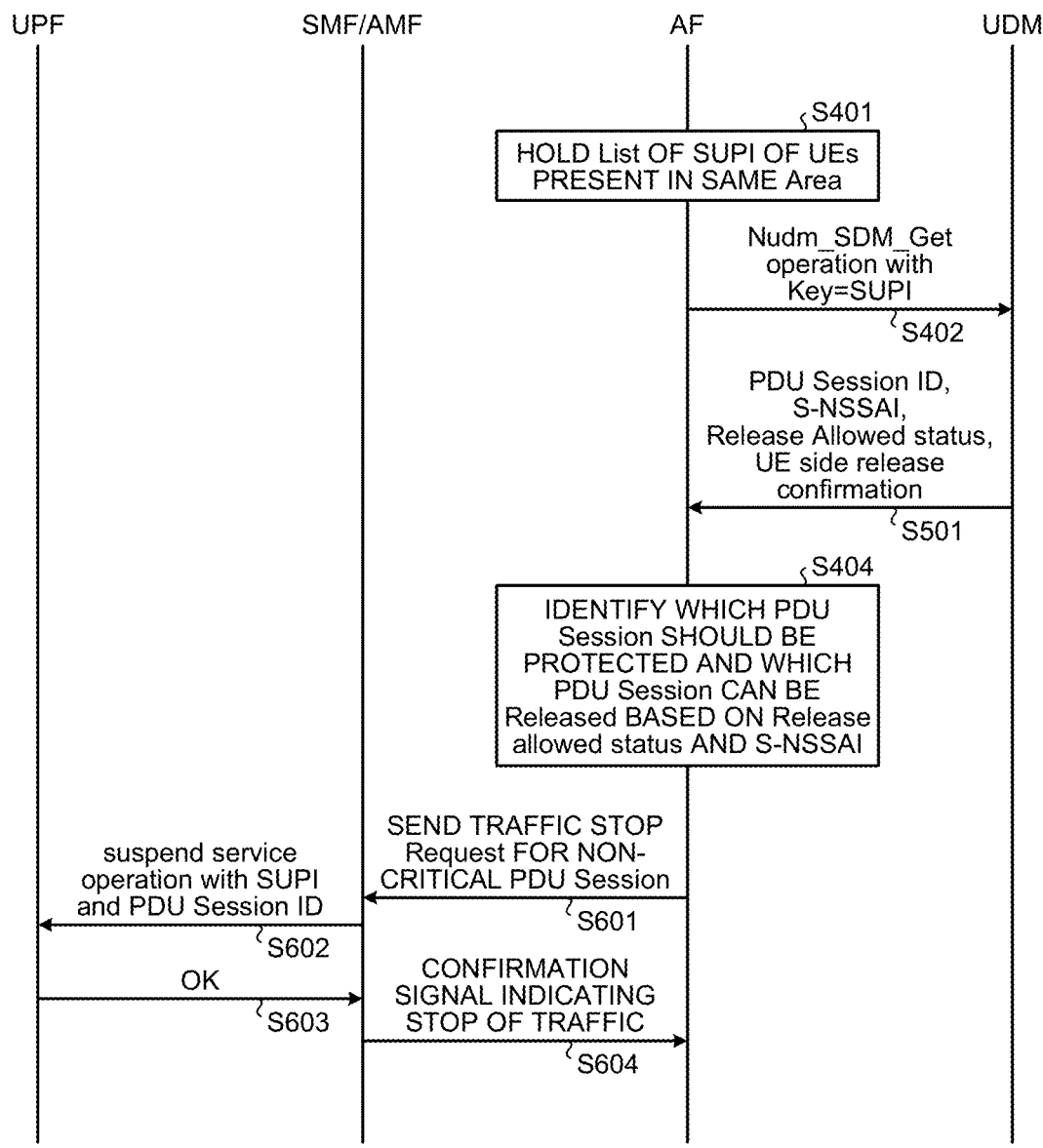
FIG. 20 is a sequence diagram illustrating a procedure of traffic stop processing by the AF node according to the embodiment of the present disclosure.

Hereinafter, traffic stop processing by the AF node 10 will be described with reference to FIG. 20. FIG. 20 is a sequence diagram illustrating a procedure of traffic stop processing by the AF node 10 according to the embodiment of the present disclosure. Note that the same procedures as those illustrated in FIG. 19 are denoted by the same reference numerals, and description thereof is omitted.

The AF node 10 that has specified the non-critical PDU session in step S404 transmits a traffic stop request for the specified non-critical PDU session to the SMF node 136 or the AMF node 139 (step S601).

Upon receiving the request, the SMF node 136 or the AMF node 139 requests the UPF node 150 to stop traffic of a non-critical PDU session by using a suspend service operation in which SUPI and a PDU session ID are specified (step S602).

The UPF node 150 that has stopped the traffic transmits a stop confirmation signal ("OK") to the SMF node 136 or the AMF node 139 (step S603). The SMF node 136 or the AMF node 139 transmits a confirmation signal indicating that the traffic has stopped to the AF node 10 (step S604).

Here, the AF node 10 requests the UPF node 150 to stop traffic via the SMF node 136 or the AF node 10 because the UPF node 150 does not have an API. Therefore, the AF node 10 cannot directly send a request to the UPF node 150.

Therefore, in the present embodiment, a new API is provided in the SMF node 136. More specifically, the input of the new API is set as the SUPI and the PDU session ID. Having receiving such an input, an API of outputting from the SMF node 136 to the UPF node 150 an instruction to stop the traffic of the input SUPI and PDU session ID in each of the uplink and the downlink is newly created.

This allows the AF node 10 to request the UPF node 150 to stop traffic via the SMF node 136.

Note that an API may be newly provided in the UPF node 150, and the AF node 10 may directly request the UPF node 150 to stop the traffic via the API.

As described above, the AF node 10 requests release of the non-critical PDU session or stop of traffic. This allows the AF node 10 to protect the critical PDU session from interference by the non-critical PDU session, making it possible to ensure communication in the critical PDU session.

4.3. Release Timing

Determining at which timing the AF node 10 requests to release the PDU session is critical because it affects the communication status of the system. For example, if the AF node 10 excessively releases non-critical PDU sessions, communication of the non-critical PDU sessions would be hindered. On the other hand, if the AF node 10 does not release the non-critical PDU session, communication of the critical PDU session might be hindered by interference from the non-critical PDU session, leading to a failure in executing critical communication.

In this manner, in order to enable non-critical communication while protecting critical communication, the AF node 10 is required to release the PDU session at an appropriate timing.

In view of this, in the present embodiment, for example, when a request for protection of a critical PDU session is received from the terminal device 40 that performs communication in a critical PDU session, the AF node 10 requests release of a non-critical PDU session.

With this configuration, the AF node 10 can release the non-critical PDU session when the terminal device 40 performs critical communication in the PDU session, and can suppress unnecessary release of the PDU session.

The AF node 10 has two functions, namely, functions as the user plane and the control plane. The AF node 10 of the control plane can be connected to another NF node with a bus of Service Based Architecture. Therefore, the AF node 10 communicating with the terminal device 40 of a specific SUPI receives a request from the terminal device 40 and performs critical communication with another AF node for a fixed time period, and thus, makes a notification of a request to stop other communication. Examples of the critical communication include communication in which the terminal device 40 desires to maintain communication quality, such as an example of uploading a critical video while shooting a critical in a movie making, and an example in which a critical device in a factory operates for 5 minutes in one hour cycle.

Figure 21:
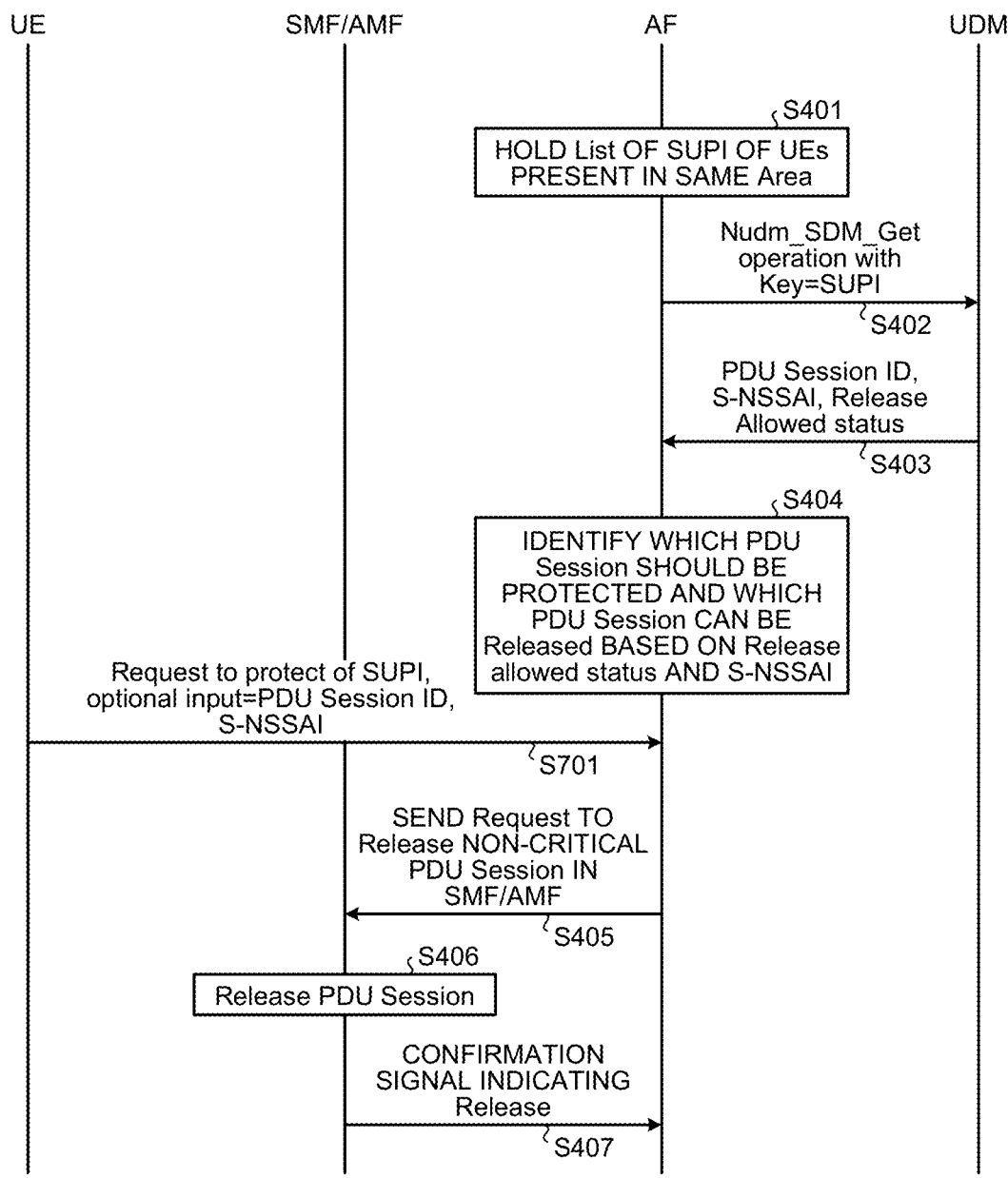
FIG. 21 is a sequence diagram illustrating a PDU session release processing procedure by the AF node according to the embodiment of the present disclosure.

Hereinafter, PDU session release processing by the AF node 10 will be described with reference to FIG. 21. FIG. 21 is a sequence diagram illustrating a PDU session release processing procedure by the AF node 10 according to the embodiment of the present disclosure. Note that the same procedures as those illustrated in FIG. 19 are denoted by the same reference numerals, and description thereof is omitted.

The AF node 10 that has specified the non-critical PDU session in step S404 receives, from the UE (terminal device 40), a request for protection of the critical PDU session with the SUPI as an input (step S701). The AF node 10 may optionally receive as input a PDU session ID and/or S-NSSAI. The subsequent processing is the same as that in FIG. 19. Note that the SMF node 136 or the AMF node 139 releases the UE PDU session other than the UE that has transmitted the request in step s406.

Although this is a case where the terminal device 40 protects critical communication when it performs the critical communication, the protection request is not limited thereto. For example, it is also allowable to use a method in which the terminal device 40 monitors the communication quality while performing critical communication and request protection of the communication when the terminal device 40 detects deterioration in the communication quality. In this case, the terminal device 40 requests the SMF node 136 on the core network side, for example, to protect critical communication by NAS signaling. The SMF node 136 that has received the request transfers the request to the AF node 10.

Figure 22:
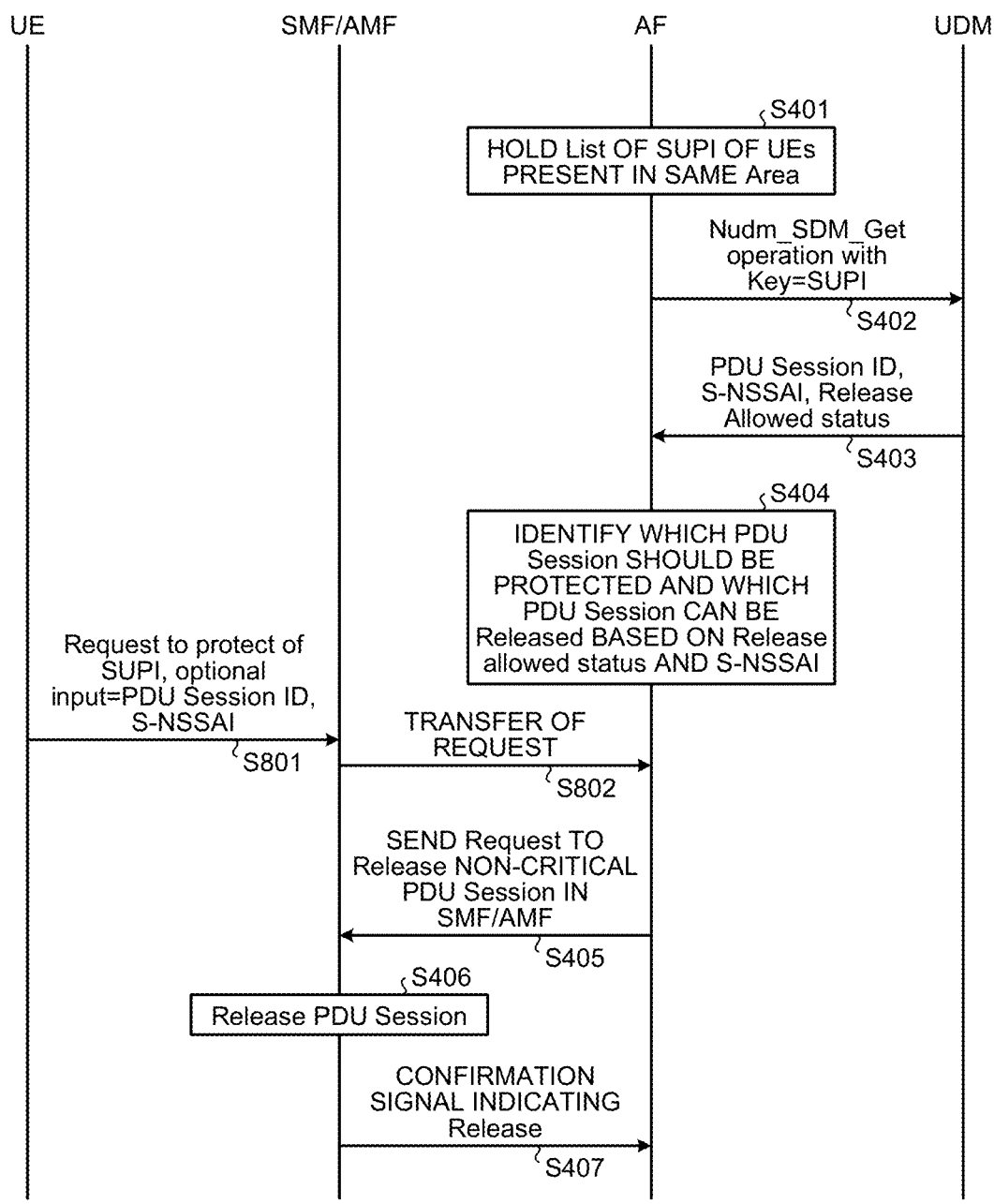
FIG. 22 is a sequence diagram illustrating a PDU session release processing procedure by the AF node according to the embodiment of the present disclosure.

Hereinafter, PDU session release processing by the AF node 10 will be described with reference to FIG. 22. FIG. 22 is a sequence diagram illustrating a PDU session release processing procedure by the AF node 10 according to the embodiment of the present disclosure. Note that the same procedures as those illustrated in FIG. 19 are denoted by the same reference numerals, and description thereof is omitted.

The UE (terminal device 40) monitors the communication quality while performing the critical communication. When the communication quality has deteriorated to be less than a predetermined threshold, the UE requests the SMF node 136 or the AMF node 139 to protect the critical communication (PDU session) using the SUPI as an input (step S801). The SMF node 136 or the AMF node 139 may optionally receive as input a PDU session ID and/or S-NSSAI.

The SMF node 136 or the AMF node 139 that has received the request transfers the request to the AF node 10. The subsequent processing is the same as the processing illustrated in FIG. 21.

Since the monitoring of the communication quality can also be performed by the application on the core network side. Accordingly, it is also allowable to make a request to the AF node 10 to protect a critical communication when the application on the core network side detects quality degradation in the critical communication. Although traffic of the entire communication system can be monitored by the UPF node 150, it is difficult to discriminate whether or not an increase in traffic of the entire system affects critical communication. Therefore, by using a method in which the terminal device 40 that performs critical communication performs the critical communication according to the monitoring result of its own traffic, it is possible to more reliably protect the critical communication.

In this manner, when the quality of critical communication deteriorates, by releasing the PDU session of non-critical communication, it is possible to reduce the PDU session release and further reduce the influence on the PDU session other than the critical PDU session.

Alternatively, the AF node 10 may request release of the PDU session in accordance with at least one of the communication frequency or the communication period of the terminal device 40. As described above, there is a case where a frequency and a period at which the terminal device 40 performs critical communication are known in advance, such as a case where a critical device in a factory operates for 5 minutes in an hour cycle. The AF node 10 holds at least one of a communication frequency or a communication period regarding such critical communication, and should request release of a PDU session of non-critical communication according to the communication frequency and the communication period in order to maintain (protect) the PDU session of the critical communication with a certain quality.

5. Other Embodiments

The above-described embodiment is an example, and various modifications and applications are possible.

In the above-described embodiment, the AF node 10 requests release of a non-critical PDU session or stop of communication, but the request is not limited thereto. For example, the AF node 10 may request not to use beams that have a possibility to be used in non-critical PDU sessions.

For example, as described above, in addition to a beam used for communication, the terminal device 40 can monitor an interfering beam that would interfere with the beam and report the interfering beam to the base station device 20. The AF node 10 acquires, for example, information regarding the interfering beam from the base station device 20 via the API in association with the PDU session or the SUPI. When such interfering beams that interfere with beams used in critical PDU sessions or critical SUPIs are used in non-critical PDU sessions or non-critical SUPI, the AF node 10 requests to stop using such interfering beams. The AF node 10 may request the base station device 20 to stop using the interfering beam via the API, or may request the base station device 20 to stop using the interfering beam via the AMF node 139 or the SMF node 136.

Furthermore, the AF node 10 identifies a beam used for communication and an interfering beam that would interfere with the beam, using a universal beam ID (or a global beam ID). The universal beam ID is an ID for uniquely identifying a beam regardless of the PLMN or the base station device 20, and is represented by a combination of a PLMN ID, an ID of the base station device 20, and a local beam ID used in the base station device 20, for example. Alternatively, the universal beam ID may be a combination of a PLMN ID, NGRAN Cell Global Identity (NCGI), and an SSB ID (an identifier of a synchronization beam). In this manner, by using the universal beam ID, the AF node 10 can uniquely identify the beam. Furthermore, the AF node 10 may request to stop using beams of non-critical PDU sessions by using the Universal Beam ID.

The control device that controls the NF node, the base station device 20, or the terminal device 40 of the present embodiment may be implemented by a dedicated computer system or a general-purpose computer system.

For example, a communication program for executing the above-described operations (for example, the transmission and reception processing) is stored in a computer-readable recording medium such as an optical disk, semiconductor memory, a magnetic tape, or a flexible disk and distributed. For example, the program is installed on a computer and the above processing is executed to achieve the configuration of the control device. At this time, the control device may be a device (for example, a personal computer) outside each NF node, the base station device 20, or the terminal device 40. Furthermore, the control device may be a device (for example, the control unit 13, the control unit 23, the control unit 33, or the control unit 45) inside each NF node, the base station device 20, or the terminal device 40.

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloaded to a computer, for example.

Furthermore, among individual processing described in the above embodiments, all or a part of the processing described as being performed automatically may be manually performed, or the processing described as being performed manually can be performed automatically by known methods. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of components of each device is provided as a functional and conceptional illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processing. Furthermore, the order of individual steps illustrated in the sequence diagram of each of the above embodiments can be altered as appropriate.

Furthermore, for example, the present embodiment can be implemented as any configuration constituting a device or a system, for example, a processor as a large scale integration (LSI) or the like, a module using a plurality of processors or the like, a unit using a plurality of modules or the like, and a set obtained by further adding other functions to the unit, or the like (that is, a configuration of a part of the device).

In the present embodiment, a system represents a set of a plurality of components (devices, modules (components), or the like), and whether all the components are in the same housing would not be a big issue. Therefore, a plurality of devices housed in separate housings and connected via a network, and one device in which a plurality of modules are housed in one housing, are both systems.

Furthermore, for example, the present embodiment can adopt a configuration of cloud computing in which one function is cooperatively shared and processed by a plurality of devices via a network.

6. Supplementary Notes

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Among the processing described in the above embodiments, all or a part of the processing described as being performed automatically may be manually performed, or the processing described as being performed manually can be performed automatically by known methods. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of components of each device is provided as a functional and conceptional illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Note that the following configurations also belong to the technical scope of the present disclosure.

(1)

An application function node comprising a control unit that performs operations including:

acquiring session information regarding a PDU session from a UDM node;

determining, from the plurality of PDU sessions, a first PDU session for maintaining communication and a second PDU session for stopping communication based on the session information; and requesting to stop communication in the determined second PDU session.

(2)

The application function node according to (1), wherein the session information is information indicating suitability of stop of the communication.

(3)

The application function node according to (2), wherein the session information is at least one of information regarding a network slice and information regarding quality of service (QoS).

(4)

The application function node according to any one of (1) to (3), wherein the control unit requests to stop communication in the second PDU session by requesting an SMF node or an AMF node to release the second PDU session.

(5)

The application function node according to (4), wherein the control unit notifies a terminal device that performs communication in the second PDU session of release of the second PDU session, and then requests the release of the second PDU session.

(6)

The application function node according to any one of (1) to (3), wherein the control unit requests a terminal device that performs communication in the second PDU session to release the second PDU session.

(7)

The application function node according to any one of (1) to (6), wherein, in response to a request from a terminal device that performs communication in the first PDU session, the control unit determines the first PDU session and the second PDU session, and requests to stop communication in the second PDU session.

(8)

The application function node according to any one of (1) to (7), wherein, in accordance with at least one of a communication frequency or a communication period of a terminal device that performs communication in the first PDU session, the control unit determines the first PDU session and the second PDU session, and requests to stop communication in the second PDU session.

(9)

The application function node according to any one of (1) to (8), wherein, in accordance with a communication quality monitored by at least one of a terminal device or a base station device that performs communication in the first PDU session, the control unit determines the first PDU session and the second PDU session, and requests to stop communication in the second PDU session.

(10)

The application function node according to any one of (1) to (9), wherein the application function node is a network function node that belongs to a core network and is the network function node except an SMF node or an AMF node.

(11)

The application function node according to any one of (1) to (10), wherein the application function node is a node that belongs to a local 5G core network.

(12)

A communication method comprising:

acquiring session information regarding a PDU session from a UDM node;

determining, from the plurality of PDU sessions, a first PDU session for maintaining communication and a second PDU session for stopping communication based on the session information; and requesting to stop communication in the determined second PDU session.

REFERENCE SIGNS LIST

10 AF NODE
11 COMMUNICATION UNIT
12 STORAGE UNIT
13 CONTROL UNIT
20 BASE STATION DEVICE
30 UDM NODE
40 TERMINAL DEVICE
136 SMF NODE
139 AMF NODE

The invention claimed is:

1. An application function (AF) node comprising a control circuitry that performs operations including:

acquiring, from a unified data management (UDM) node, session information that includes forced termination information, wherein the session information indicates a plurality of subscriber permanent identifiers (SUPIs), each SUPI of the plurality of SUPIs identifying a unique combination of a protocol data unit (PDU) session of a plurality of PDU sessions and a network slice of a plurality of network slices, and wherein the forced termination information indicates a first SUPI of the plurality of SUPIs corresponding to a critical protocol data unit (PDU) session/network slice combination where a forced termination is not permitted and a second SUPI of the plurality of SUPIs corresponding to a non-critical PDU session/network slice combination where a forced termination is permitted: and based on the forced termination information, requesting to stop communication only in the non-critical PDU session/network slice combination while maintaining communication in the critical PDU session/network slice combination, wherein the requesting to stop communication only in the non-critical PDU session/network slice combination comprises requesting to stop a beam corresponding to the non-critical PDU session/network slice combination that interferes with a beam corresponding to the critical PDU session/network slice.

2. The AF node according to claim 1, wherein the session information further indicates information regarding a first quality of service (QoS) of corresponding to the critical PDU session/network slice combination, the first QoS being higher than a second QoS corresponding to the non-critical PDU session/network slice combination.

3. The AF node according to claim 1, wherein the control circuitry requests to stop the communication in the non-critical PDU session/network slice combination by requesting a session management function (SMF) node or an access management function (AMF) node to release the non-critical PDU session/network slice combination.

4. The AF node according to claim 3, wherein the control circuitry notifies a terminal device that performs the communication in the non-critical PDU session/network slice combination of a release of the non-critical PDU session/network slice combination, prior to requesting the release of the non-critical PDU session/network slice combination.

5. The AF node according to claim 1, wherein the control circuitry requests a terminal device that performs the communication in the non-critical PDU session/network slice combination to release the non-critical PDU session/network slice combination.

6. The AF node according to claim 1, wherein, in response to a request from a terminal device that performs the communication in the critical PDU session/network slice combination, the control circuitry determines the critical PDU session/network slice combination and the non-critical PDU session/network slice combination, and requests to stop communication only in the non-critical PDU session/network slice combination.

7. The AF node according to claim 1, wherein, in accordance with at least one of a communication frequency or a communication period of a terminal device that performs communication in the critical PDU session/network slice combination, the control circuitry determines the critical PDU session/network slice combination and the non-critical PDU session/network slice combination, and requests to stop communication only in the non-critical PDU session/network slice combination.

8. The AF node according to claim 1, wherein the application function node is a network function node that belongs to a core network and is the network function node except a session management function (SMF) node or an access management function (AMF) node.

9. The AF node according to claim 1, wherein the AF node is a node that belongs to a local 5G core network.

10. A communication method performed by a device configured to operate as an application function (AF) node, the communication method comprising:
    acquiring, from a unified data management (UDM) node, session information includes forced termination information,
    wherein the session information indicates a plurality of subscriber permanent identifiers (SUPIs), each SUPI of the plurality of SUPIs identifying a unique combination of a protocol data unit (PDU) session of a plurality of PDU sessions and a network slice of a plurality of network slices, and
    wherein the forced termination information indicates a first SUPI of the plurality of SUPIs corresponding to a critical protocol data unit (PDU) session/network slice combination where a forced termination is not permitted and a second SUPI of the plurality of SUPIs corresponding to a non-critical PDU session/network slice combination where a forced termination is permitted; and
    based on the forced termination information, requesting to stop communication only in the non-critical PDU session/network slice combination while maintaining communication in the critical PDU session/network slice combination,
    wherein the requesting to stop communication only in the non-critical PDU session/network slice combination comprises requesting to stop a beam corresponding to the non-critical PDU session/network slice combination that interferes with a beam corresponding to the critical PDU session/network slice.

11. A non-transitory computer product containing instructions that cause a device operating as an application function (AF) node to perform a communication method, the communication method comprising:
    acquiring, from a unified data management (UDM) node, session information includes forced termination information,
    wherein the session information indicates a plurality of subscriber permanent identifiers (SUPIs), each SUPI of the plurality of SUPIs identifying a unique combination of a protocol data unit (PDU) session of a plurality of PDU sessions and a network slice of a plurality of network slices, and
    wherein the forced termination information indicates a first SUPI of the plurality of SUPIs corresponding to a critical protocol data unit (PDU) session/network slice combination where a forced termination is not permitted and a second SUPI of the plurality of SUPIs corresponding to a non-critical PDU session/network slice combination where a forced termination is permitted; and
    based on the forced termination information, requesting to stop communication only in the non-critical PDU session/network slice combination while maintaining communication in the critical PDU session/network slice combination,
    wherein the requesting to stop communication only in the non-critical PDU session/network slice combination comprises requesting to stop a beam corresponding to the non-critical PDU session/network slice combination that interferes with a beam corresponding to the critical PDU session/network slice.

* * * * *